(12) United States Patent
Hooker et al.

(10) Patent No.: US 11,467,675 B1
(45) Date of Patent: Oct. 11, 2022

(54) MULTI-COMPONENT DETECTION OF GESTURES

(71) Applicant: Facebook Technologies, LLC, Menlo Park, CA (US)

(72) Inventors: Rodney Hooker, Redmond, WA (US); Maurizio Paganini, San Jose, CA (US); Harshit Khaitan, Fremont, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/302,301

(22) Filed: Apr. 29, 2021

(51) Int. Cl.
*G06F 3/01* (2006.01)
*G06F 3/0346* (2013.01)

(52) U.S. Cl.
CPC .............. *G06F 3/017* (2013.01); *G06F 3/015* (2013.01); *G06F 3/0346* (2013.01)

(58) Field of Classification Search
None
See application file for complete search history.

(56) References Cited

U.S. PATENT DOCUMENTS

| | | | | |
|---|---|---|---|---|
| 2014/0240223 A1* | 8/2014 | Lake | ........................ | G06F 3/011 345/156 |
| 2015/0277575 A1 | 10/2015 | Ataee et al. | | |
| 2017/0090583 A1 | 3/2017 | Zamora Esquivel et al. | | |
| 2017/0097413 A1* | 4/2017 | Gillian | .................. | H04W 16/28 |
| 2020/0202129 A1 | 6/2020 | Reyes et al. | | |

OTHER PUBLICATIONS

International Search Report and Written Opinion for International Application No. PCT/US2022/026906 dated Aug. 19, 2022, 12 pages.
Raurale S.A., et al., "Real-Time Embedded EMG Signal Analysis for Wrist-Hand Pose Identification," IEEE Transactions On Signal Processing, vol. 68, Apr. 3, 2020, pp. 2713-2723.

* cited by examiner

*Primary Examiner* — Carl Adams
(74) *Attorney, Agent, or Firm* — Shumaker & Sieffert, P.A.

(57) ABSTRACT

This disclosure describes techniques for recognizing gestures performed by a user, including techniques for conserving power when performing finger or hand gesture recognition operations that involve processing electromyography (EMG) data. In one example, a wearable device capable of being worn by a user comprises: a motion detector configured to detect motion of the wearable device; a tissue movement sensor configured to collect tissue movement information associated with motion of muscles or tissues beneath the user's skin; and a gesture detection module. The gesture detection module is configured to: detect motion data; enable the tissue movement sensor to collect tissue movement data; initiate a first process to determine a likelihood that a gesture occurred; initiate a second process to identify the gesture; determine, before the second process has completed, the likelihood that a gesture has occurred; and responsive to determining the likelihood, determining whether to allow the second process to continue.

21 Claims, 8 Drawing Sheets

US 11,467,675 B1

MULTI-COMPONENT DETECTION OF GESTURES

TECHNICAL FIELD

This disclosure generally relates to gesture recognition techniques, including techniques that may be performed by an artificial reality system to detect gestures.

BACKGROUND

Systems using gesture recognition (e.g., finger or hand gesture recognition) are increasingly being used in many fields, such as computer gaming, health and safety, industrial, and education. Artificial reality systems, for example, often use gesture recognition. In general, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality systems are being incorporated into mobile devices, gaming consoles, personal computers, movie theaters, and theme parks.

Typical artificial reality systems include one or more devices for as part of an overall system. As one example, an artificial reality system may incorporate a head-mounted display (HMD) worn by a user and configured to output artificial reality content to the user. Such a system may also include other wearable devices (e.g., an arm band), at least to support the overall artificial reality system. During operation, a user interacts with the artificial reality system to select content, launch applications, affect the environment, or otherwise navigate the form of reality presented.

SUMMARY

This disclosure describes techniques for recognizing gestures performed by a user. Such techniques may be applicable to augmented and virtual reality systems or more general combination of augmented and virtual reality systems, all together referred to as extended reality (XR) systems. As described herein, power reduction techniques are used for finger or hand gesture recognition operations that involve processing inertial measurement unit (IMU) and electromyography (EMG) data. A wearable device (e.g., an arm band, bracelet, patch, or ring) that includes both an IMU sensor and an EMG sensor may be employed. The IMU may sense motion, and the EMG sensors may transduce sensed skeletal tissue or muscle activity to multiple analog output signal streams ("channels"). In some examples, techniques may be used to incrementally waken a sequence of progressively more-capable sensors and sub-systems, on an as-needed basis, to eventually recognize a definitive gesture while reducing power consumption and maintaining an acceptable gesture recognition identification time and accuracy. Such techniques may use specialized hardware and digital signal processing (DSP) devices, within the wearable device, to transform sensor data from the EMG channels into data used by a neural network or other logic.

In some examples, multiple processes may concurrently process some or all of the same sensor data to arrive at an informed guess about whether the user is performing a gesture. If an early-finishing process concludes that a gesture was likely performed by the user, other processes being performed by specialized hardware and/or DSP components may be allowed to continue processing, and in addition, an application processor may be started or awakened. However, if an early-finishing process concludes that a gesture did not occur, such other processes may be terminated or not started altogether to avoid further consumption of processing resources and power.

Some of the techniques of this disclosure may provide specific technical improvements and advantages. For example, by using an incremental approach to engaging various components and/or capabilities of a wearable device, such a wearable device may more effectively and intelligently consume power, enabling effective operation within an XR ecosystem for a longer period and/or without requiring numerous recharging cycles. In addition, by using an incremental approach to activating various components and/or capabilities of a wearable device, power management constraints can be managed with little or no effect on device responsiveness and/or perceived responsiveness.

This disclosure primarily describes operations performed by a wearable device within, for example, an XR system in accordance with one or more aspects of this disclosure. In one specific example, this disclosure describes a wearable device capable of being worn by a user comprising: a motion detector configured to detect motion of the wearable device; a tissue movement sensor configured to collect tissue movement information associated with motion of tissues beneath the user's skin; and a gesture detection module comprising processing circuitry and configured to: detect, based on input sensed by the motion detector, motion data associated with movement of the wearable device, enable the tissue movement sensor to collect tissue movement data associated with motion of tissues beneath the user's skin, initiate a first process to determine, based on the motion data and the tissue movement data, a likelihood that a gesture occurred, initiate a second process to identify, based on the motion data and the tissue movement data, the gesture, determine, by the first process and before the second process has completed, the likelihood that a gesture has occurred, and responsive to determining the likelihood, determining whether to allow the second process to continue.

In another specific example, this disclosure describes a method comprising: detecting motion data associated with movement of a wearable device worn by a user; enabling a tissue movement sensor, included within the wearable device, to collect tissue movement data associated with motion of tissues beneath the user's skin; initiating a first process to determine, by a computing system and based on the motion data and the tissue movement data, a likelihood that a gesture occurred; initiating a second process to identify, by the computing system and based on the motion data and the tissue movement data, the gesture; determining, by the first process and before the second process has completed, the likelihood that a gesture has occurred; and responsive to determining the likelihood, determining, by the computing system, whether to allow the second process to continue.

In another specific example, this disclosure describes system comprising a head-mounted display (HMD), capable of being worn by a user; a peripheral device; and a wearable device that is capable of being worn by the user and is configured to: detect, based on input sensed by a motion detector included within the wearable device, motion data associated with movement of the wearable device, enable a tissue movement sensor included within the wearable device to collect tissue movement data associated with motion of tissues beneath the user's skin, initiate a first process to determine, based on the motion data and the tissue movement data, a likelihood that a gesture occurred, initiate a second process to identify, based on the motion data and the tissue movement data, the gesture, determine, by the first process and before the second process has completed, the likelihood that a gesture has occurred, and responsive to determining the likelihood, determining whether to allow the second process to continue.

In another specific example, this disclosure describes a non-transitory computer-readable medium comprising instructions for causing one or more processors of an artificial reality system to perform operations comprising: detecting motion data associated with movement of a wearable device capable of being worn by a user; enabling a tissue movement sensor, included within the wearable device, to collect tissue movement data associated with motion of tissues beneath the user's skin; initiating a first process to determine, based on the motion data and the tissue movement data, a likelihood that a gesture occurred; initiating a second process to identify, based on the motion data and the issue movement data, the gesture; determining, by the first process and before the second process has completed, the likelihood that a gesture has occurred; and responsive to determining the likelihood, determining whether to allow the second process to continue.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Wearable devices, such as those that might be used in an XR system, typically are expected to detect motion and/or gestures. Such wearable devices tend to operate in an "always-on" or "persistent-on" domain so that they are ready at any time to detect and act on a gesture performed by the user wearing the device. Such persistent-on devices are often battery-powered and therefore present a power consumption challenge. Persistent-on wearable devices spend much of their time in a low power or sleep mode, but as described herein, some aspects of circuitry within such a device may remain active, even while the device is in low power or sleep mode. In particular, circuitry within the device that detects motion and awakens other parts of the device might actively operate in most, if not all, operating modes of the device.

Techniques described herein involve enabling and/or activating various parts of a wearable device in an as-needed manner, principally in the interest of conserving power. As described herein, for example, a wearable device may detect motion, identify the motion as a gesture, and act on the gesture. To perform these operations, components of the wearable device may be incrementally powered on and/or activated as the device determines whether a gesture has been performed, and if so, the identity of the gesture. As the device converges on a conclusion as to the identity of the gesture that has been performed, additional components, sensors, and/or processing circuitry of the device may be activated.

In some examples, components of the device that are initially activated may be responsible for determining simply whether a gesture has been performed. If such components determine that a gesture likely has been performed, additional components might be activated to identify the specific gesture that has been performed. Along the way, and once the device concludes that an actionable gesture has occurred, other components may be activated in anticipation of enabling the device to later act on the gesture in a responsive way. In general, and as described herein, components of a wearable device may be enabled or activated only when the device determines, based on an assessment informed by input received from sensors within the device, that there is a sufficient likelihood that such components will be needed to identify and/or act on the gesture.

Figure 1A:
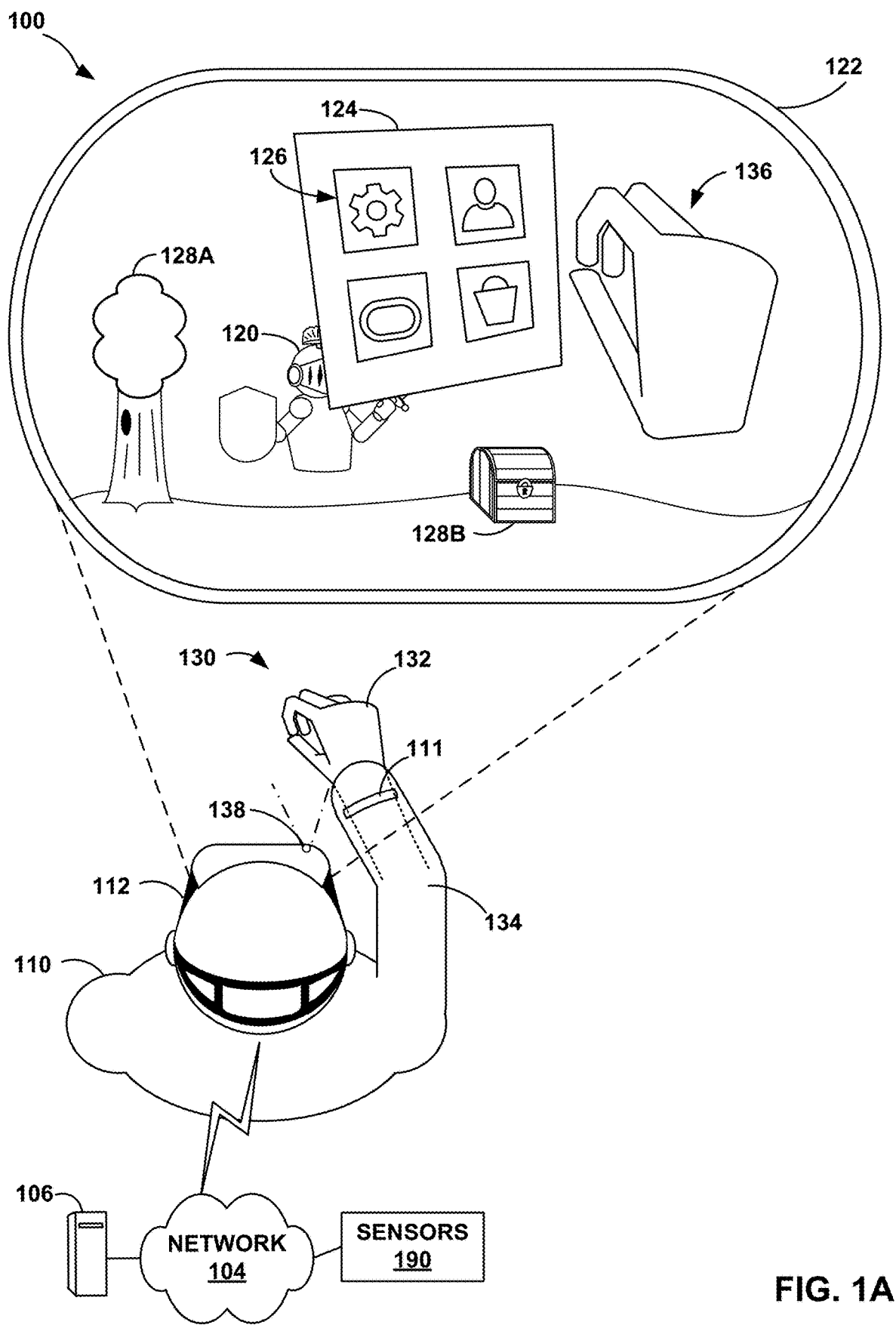
FIG. 1A is an illustration depicting an example artificial reality system that includes a wearable device in accordance with the techniques of the disclosure.

FIG. 1A is an illustration depicting an example XR system 100 that includes a wearable device, and which presents and controls user interface elements within an artificial reality environment in accordance with the techniques of the disclosure. In some example implementations, artificial reality system 100 generates and renders graphical user interface elements to a user 110 in response to one or more detected gestures performed by user 110. That is, as described herein, XR system 100 presents one or more graphical user interface elements 124, 126 in response to detecting one or more particular gestures performed by user 110, such as particular motions, configurations, locations, and/or orientations of the user's hands, fingers, thumbs or arms. In other examples, artificial reality system 100 presents and controls user interface elements specifically designed for user interaction and manipulation within an XR environment, such as specialized toggle elements, drop-down elements, menu selection elements, graphical input keys or keyboards, content display windows and the like.

In the example of FIG. 1A, XR system 100 includes wearable device 111, head mounted device (HMD) 112, console 106 and, in some examples, one or more external sensors 190. Wearable device 111 is shown in the example of FIG. 1A as bracelet-like structure worn on the right wrist of user 110 (in this example, device 111 is obscured by clothing worn by user 110). Other forms of wearable device 111 are possible (e.g., arm band, leg band, ring, glove, adhesive patch) and techniques described herein may be applicable to any such alternative form of wearable device 111.

Further, although components of wearable device 111 are not specifically illustrated in FIG. 1A, wearable device 111 may include processing circuitry, an inertial measurement unit (IMU), and one or more input devices and/or output devices. Input devices may include sensors that transduce sensed skeletal muscle activity (e.g., electromyography data) to multiple analog output signal streams ("channels"). To collect skeletal muscle activity, such sensors may be in contact with the skin of user 110, and may be located on the underside (i.e., skin-facing side) of wearable device 111. Input devices may include other types of sensors, including, for example, audio, light, or camera sensors. Such sensors could also include other types of movement sensors, could include heart rate, carbon electrode, electrocardiogram sensors, and/or could include any other type of sensor now known or hereafter developed. Output devices may include light-generating devices, audio or sound generating devices, haptic devices, and/or display devices.

HMD 112 is typically worn by user 110 and includes an electronic display and optical assembly for presenting artificial reality content 122 to user 110. In addition, HMD 112 includes one or more sensors (e.g., accelerometers) for tracking motion of the HMD and may include one or more image capture devices 138, e.g., cameras, line scanners and the like, for capturing image data of the surrounding physical environment.

Console 106 is shown in the example of FIG. 1A as a single computing device, such as a gaming console, workstation, a desktop computer, or a laptop. In other examples, console 106 may be distributed across a plurality of computing devices, such as a distributed computing network, a data center, or a cloud computing system. Console 106, wearable device 111, HMD 112, and sensors 190 may, as shown in this example, be communicatively coupled via network 104, which may be a wired or wireless network, such as WiFi, a mesh network or a short-range wireless communication medium. Although wearable device 111 and HMD 112 are shown in this example as in communication with, e.g., tethered to or in wireless communication with, console 106, in some implementations wearable device 111 and/or HMD 112 operates as a stand-alone, mobile system.

In general, artificial reality system 100 uses information captured from a real-world, 3D physical environment to render artificial reality content 122 for display to user 110. In the example of FIG. 1A, user 110 views the artificial reality content 122 constructed and rendered by an artificial reality application executing on console 106 and/or HMD 112. As one example, artificial reality content 122 may be a consumer gaming application in which user 110 is rendered as avatar 120 with one or more virtual objects 128A, 128B. In some examples, artificial reality content 122 may comprise a mixture of real-world imagery and virtual objects, e.g., mixed reality and/or augmented reality. In other examples, artificial reality content 122 may be, e.g., a video conferencing application, a navigation application, an educational application, training or simulation applications, or other types of applications that implement artificial reality.

During operation, the artificial reality application constructs artificial reality content 122 for display to user 110 by tracking and computing pose information for a frame of reference, typically a viewing perspective of HMD 112. Using HMD 112 as a frame of reference, and based on a current field of view 130 as determined by a current estimated pose of HMD 112, the artificial reality application renders 3D artificial reality content which, in some examples, may be overlaid, at least in part, upon the real-world, 3D physical environment of user 110. During this process, the artificial reality application uses sensed data received from wearable device 111 and/or HMD 112, such as movement information and user commands, and, in some examples, data from any external sensors 190, such as external cameras, to capture 3D information within the real world, physical environment, such as motion by user 110 and/or feature tracking information with respect to user 110. Based on the sensed data, the artificial reality application determines a current pose for the frame of reference of HMD 112 and, in accordance with the current pose, renders the artificial reality content 122.

Moreover, in accordance with the techniques of this disclosure, based on the sensed data, the artificial reality application detects gestures performed by user 110 and, in response to detecting one or more particular gestures, performs operations consistent with the gesture. For example, gestures may cause wearable device 111 to generate output (audio, haptic response, present information on a display included on the wearable device 111). In other examples, where gestures might involve interactions with avatar 120 and/or virtual objects 128, such gestures may invoke an in-game or in-application response, such as changing or otherwise modifying the artificial reality experience or updating, affecting, modifying, the artificial reality content presented within HMD 112.

In other examples, such gestures may cause one or more user interface elements, e.g., UI menu 124 and UI element 126, to be overlaid on underlying artificial reality content 122 being presented to the user. In such an example, user interface elements 124, 126 may be viewed as part of the artificial reality content 122 being presented to the user in the artificial reality environment. In this way, artificial reality system 100 dynamically presents one or more graphical user interface elements 124, 126 in response to detecting one or more particular gestures by user 110, such as particular motions, configurations, positions, and/or orientations of the user's hands, fingers, thumbs or arms. Example configurations of a user's hand may include a fist, one or more digits extended, the relative and/or absolute positions and orientations of one or more of the individual digits of the hand, the shape of the palm of the hand, and so forth. The user interface elements may, for example, be a graphical user interface, such as a menu or sub-menu with which user 110 interacts to operate the artificial reality system, or individual user interface elements selectable and manipulatable by user 110, such as toggle elements, drop-down elements, menu selection elements, two-dimensional or three-dimensional shapes, graphical input keys or keyboards, content display windows and the like. While depicted as a two-dimensional element, for example, UI element 126 may be a two-dimensional or three-dimensional shape that is manipulatable by a user performing gestures to translate, scale, and/or rotate the shape in the artificial reality environment.

Moreover, as described herein, in some examples, artificial reality system 100 may trigger generation and rendering of graphical user interface elements 124, 126 in response to other conditions, such as a current state of one or more applications being executed by the system, or the position and orientation of the particular detected gestures in a physical environment in relation to a current field of view 130 of user 110, as may be determined by real-time gaze tracking of the user, or other conditions.

More specifically, as further described herein, image capture devices 138 of HMD 112 capture image data representative of objects in the real world, physical environment that are within a field of view 130 of image capture devices 138. Field of view 130 typically corresponds with the viewing perspective of HMD 112. In some examples, such as the illustrated example of FIG. 1A, the artificial reality application renders the portions of hand 132 of user 110 that are within field of view 130 as a virtual hand 136 within artificial reality content 122. In other examples, the artificial reality application may present a real-world image of hand 132 and/or arm 134 of user 110 within artificial reality content 122 comprising mixed reality and/or augmented reality. In either example, user 110 is able to view the portions of their hand 132 and/or arm 134 that are within field of view 130 as objects within artificial reality content 122. In other examples, the artificial reality application might not render hand 132 or arm 134 of the user at all.

During operation, XR system 100 may perform object recognition within image data captured by image capture devices 138 of HMD 112 to identify hand 132, including optionally identifying individual fingers or the thumb, and/ or all or portions of arm 134 of user 110. Further, XR system 100 may track the position, orientation, and configuration of hand 132 (optionally including particular digits of the hand) and/or portions of arm 134 over a sliding window of time. The artificial reality application analyzes any tracked motions, configurations, positions, and/or orientations of hand 132 and/or portions of arm 134 to identify one or more gestures performed by particular objects, e.g., hand 132 (including particular digits of the hand) and/or portions of arm 134 of user 110. To detect the gesture(s), the artificial reality application may compare the motions, configurations, positions and/or orientations of hand 132 and/or portions of arm 134 to gesture definitions stored in a gesture library of XR system 100, where each gesture in the gesture library may be each mapped to one or more actions. In some examples, detecting movement (which could correspond to a gesture) may include tracking positions of one or more of the digits (individual fingers and thumb) of hand 132, including whether any of a defined combination of the digits (such as an index finger and thumb) are brought together to touch or approximately touch in the physical environment. In other examples, detecting movement may include tracking an orientation of hand 132 (e.g., fingers pointing toward HMD 112 or away from HMD 112) and/or an orientation of arm 134 (e.g., the normal of the arm facing toward HMD 112) relative to the current pose of HMD 112. The position and orientation of hand 132 (or a portion thereof) thereof may alternatively be referred to as the pose of hand 132 (or a portion thereof).

Moreover, the artificial reality application may analyze configurations, positions, and/or orientations of hand 132 and/or arm 134 to identify a gesture that includes hand 132 and/or arm 134 being held in one or more specific configuration, positions, and/or orientations for at least a threshold period of time. As examples, one or more particular positions at which hand 132 and/or arm 134 are being held substantially stationary within field of view 130 for at least a configurable period of time may be used by artificial reality system 100 as an indication that user 110 is attempting to perform a gesture intended to trigger a desired response by the artificial reality application, such as triggering display of a particular type of user interface element 124, 126, such as a menu. As another example, one or more particular configurations of the fingers and/or palms of hand 132 and/or arm 134 being maintained within field of view 130 for at least a configurable period of time may be used by artificial reality system 100 as an indication that user 110 is attempting to perform a gesture. Although only right hand 132 and right arm 134 of user 110 are illustrated in FIG. 1A, in other examples, artificial reality system 100 may identify a left hand and/or arm of user 110 or both right and left hands and/or arms of user 110. In this way, artificial reality system 100 may detect single-handed gestures performed by either hand, double-handed gestures, or arm-based gestures within the physical environment, and generate associated user interface elements in response to the detected gestures.

One primary function of wearable device 111 within system 100 is to sense and identify gestures performed by user 110. In typical cases, such gestures involve user 110 moving hand 132 and/or arm 134. Wearable device 111 senses and identifies such movement through a combination of sensors and computing modules that process data describing motion corresponding to the gesture performed. As described herein, some components of wearable device 111 (e.g., processing components, sensors) may use significant amounts of power, and if such components are always active, wearable device 111 will consume power at a rate that might prevent wearable device 111 from effectively operating within XR system 100 for an appropriate period of time. Accordingly, modulating the power consumption of certain components of wearable device 111 may enable the device to operate more effectively within XR system 100.

One way to modulate the power consumption of wearable device 111 is to design the device to awaken and/or initiate various components of wearable device 111 in an incremental fashion, and only at appropriate times. In such a design, components and capabilities of wearable device 111 might be classified as a set of concentric rings, with the innermost ring consuming the least amount of power and having the least capability in terms of processing capability. Each successive concentric ring may have more significant power consumption needs while at the same time having higher capacity in terms of processing capability. The components and capabilities of the device in the outermost ring, therefore, would consume the most power and have the highest computing capacity. In examples described herein, innermost rings in such a model may involve fewer sensors and modules requiring less computing capacity. Outermost rings in this model may involve higher number of sensors and execution of modules that require more computing capacity. By incrementally activating each concentric ring, in an outward direction, and only when needed and only for as long as needed, an optimal balance between power consumption and gesture processing capability may be achieved.

In accordance with one or more aspects of this disclosure, wearable device 111 may detect motion and/or movement by user 110. For instance, in an example that can be described in the context of FIG. 1A, one or motion sensors within wearable device 111 detect movement (e.g., as a result of arm 134 moving with wearable device 111 attached to the wrist of user 110). Responsive to such movement or to other movement or activity of hand 132 detected by sensors within wearable device 111, for instance, wearable device 111 activates one or more electromyography sensors to collect movements of ligaments or other internal tissue within the user's wrist. Each such electromyography sensor generates a stream of electromyography (EMG) data (e.g., corresponding to a channel of EMG data) for processing by wearable device 111.

Wearable device 111 may start processes to analyze the motion and/or movement. For instance, continuing with the example being described in the context of FIG. 1A, wearable device 111 preprocesses both the motion data and the EMG data. Wearable device 111 starts a first process, which may be a relatively lightweight process, to determine whether a gesture has occurred. This first process makes such a determination based on the preprocessed motion data and EMG data. In some examples, wearable device 111 may also start a second process, soon after initiating the first process, and before the first process is completed. The second process seeks to identify the gesture that was performed (if a gesture was performed). The second process also uses the preprocessed motion data and EMG data (or, in some examples, a later version of the motion data and the EMG data that has been further preprocessed).

Wearable device 111 may act on the results of the first process that determines whether a gesture was performed. For instance, still referring to FIG. 1A, wearable device 111 receives the results of the first process before the results of the second process are available. Wearable device 111 determines, based on the results of the first process, whether the first process has concluded that no gesture was performed. If the results of the first process indicates that no gesture was performed, wearable device 111 may terminate the second process while it is still in progress (thereby avoiding any further expenditure of computing and power resources by the second process that will presumably result in the same conclusion reached by the first process). If, however, the first process was unable to conclude that no gesture was performed (e.g., the first process concludes that either a gesture was performed or one might have been performed), wearable device 111 may permit the second process to continue.

Wearable device 111 may act on the results of the process that determines the identity of the gesture. For instance, referring once again to FIG. 1A, and in an example in which the second process is allowed to continue, wearable device 111 eventually receives the results of the second process. Wearable device 111 determines, based on the results of the second process, whether a gesture was performed. If a gesture was performed, wearable device 111 determines the identity of the gesture using the results of the second process. Wearable device 111 uses the identity of the gesture to determine how to respond to the gesture. In some examples, wearable device 111 may respond to certain gestures by generating output. Such output may involve an audio, visual, or tactile response performed by wearable device 111, or may involve wearable device 111 communicating with HMD 112 and/or console 106. In some examples, such communications may cause the XR environment to be affected in some way, or may cause other systems within XR system 100 to perform some other action (e.g., update XR content 122).

Techniques described herein may provide certain technical advantages. For instance, by modulating use of components of wearable device 111, such as through incrementally enabling various components of wearable device 111, wearable device 111 may more effectively consume power, and may consume power primarily in situations that enhance the user's experience and/or enable highly-responsive interactions with the user. Consuming power in such a way may enable wearable device 111 to operate longer within XR system 100, and may reduce the frequency of recharge cycles.

Further, by identifying gestures through an incremental process, opportunities to anticipate use of various components may arise. For instance, when incrementally identifying a gesture, wearable device 111 may determine, even before a gesture is definitively identified, that an additional component (sensor, computing module, application processor) will eventually be needed. Wearable device 111 may act on such information by starting or waking that additional component, so that any startup time, wakeup time, or other associated latency will be less likely to affect or delay a response to the gesture once the gesture is definitively identified. Accordingly, aspects of the present disclosure may enable wearable device 111 to be (or appear to be) more responsive to gestures or other input.

Figure 1B:
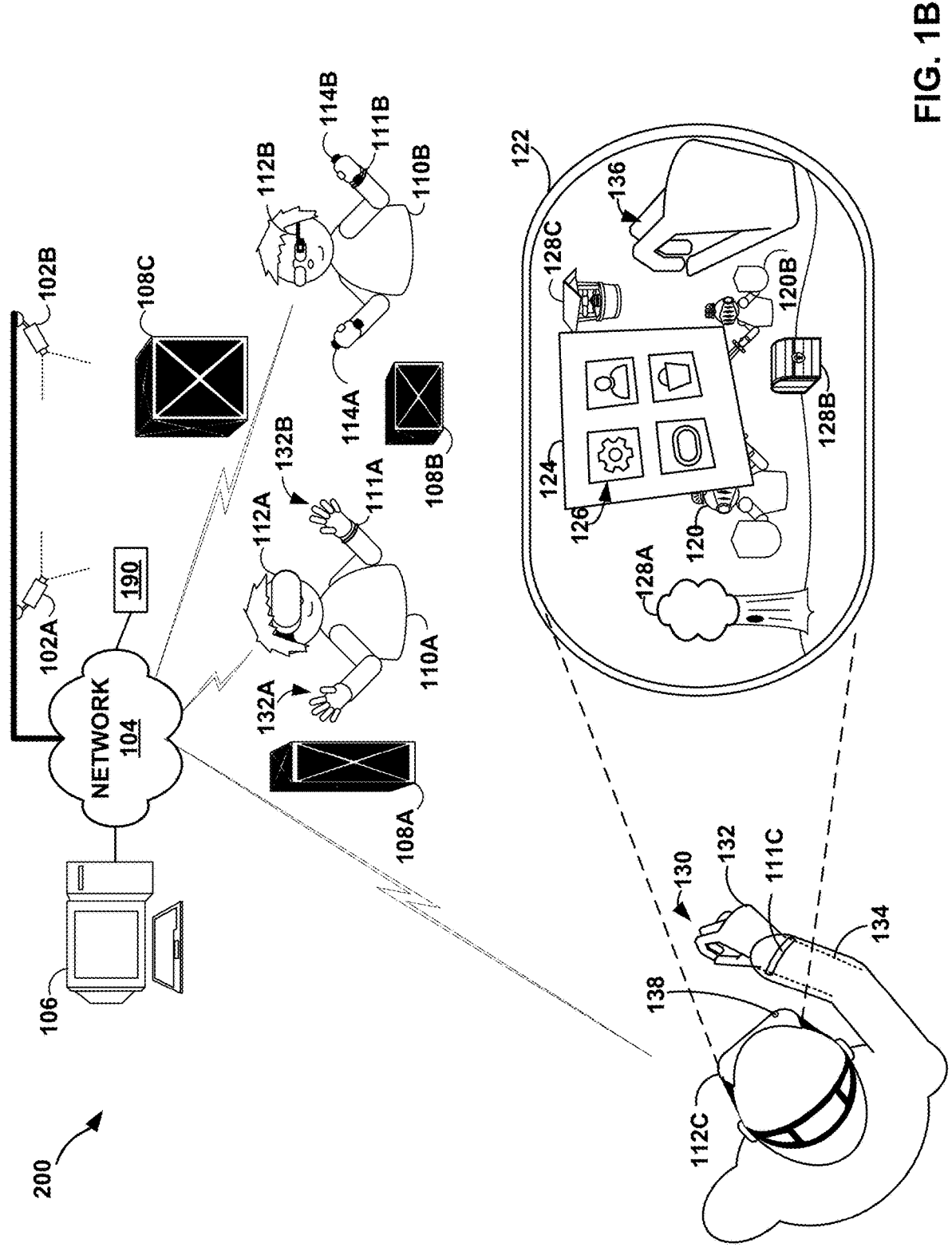
FIG. 1B is an illustration depicting another example artificial reality system in accordance with the techniques of the disclosure.

FIG. 1B is an illustration depicting another example artificial reality system 200 in accordance with the techniques of the disclosure. Similar to XR system 100 of FIG. 1A, artificial reality system 200 of FIG. 1B may present and control user interface elements specifically designed for user interaction and manipulation within an artificial reality environment. Artificial reality system 200 may also, in various examples, generate and render certain graphical user interface elements to a user in response detection of to one or more particular gestures of the user.

In the example of FIG. 1B, artificial reality system 200 includes external cameras 102A and 102B (collectively, "external cameras 102"), wearable devices 111A-111C (collectively, "wearable devices 111"), HMDs 112A-112C (collectively, "HMDs 112"), controllers 114A and 114B (collectively, "controllers 114"), console 106, and sensors 190. As shown in FIG. 1B, artificial reality system 200 represents a multi-user environment in which an artificial reality application executing on console 106, wearable devices 111, and/or HMDs 112 presents artificial reality content to each of users 110A-110C (collectively, "users 110") based on a current viewing perspective of a corresponding frame of reference for the respective user. That is, in this example, the artificial reality application constructs artificial content by tracking and computing pose information for a frame of reference for each of HMDs 112. Artificial reality system 200 uses data received from cameras 102, wearable devices 111, HMDs 112, and controllers 114 to capture 3D information within the real world environment, such as motion by users 110 and/or tracking information with respect to users 110 and objects 108, for use in computing updated pose information for a corresponding frame of reference of HMDs 112. As one example, the artificial reality application may render, based on a current viewing perspective determined for HMD 112C, artificial reality content 122 having virtual objects 128A-128C (collectively, "virtual objects 128") as spatially overlaid upon real world objects 108A-108C (collectively, "real world objects 108"). Further, from the perspective of HMD 112C, artificial reality system 200 renders avatars 120A, 120B based upon the estimated positions for users 110A, 110B, respectively.

In some examples, each of wearable devices 111 and HMDs 112 concurrently operates within artificial reality system 200. In the example of FIG. 1B, each of users 110 may be a "player" or "participant" in the artificial reality application, and any of users 110 may be a "spectator" or "observer" in the artificial reality application. Wearable devices 111 may each operate in a way that is substantially similar to wearable device 111 of FIG. 1A. Accordingly, wearable devices 111 may sense motion data and transduce sensed skeletal muscle activity (e.g., electro myography data) for each respective user 110 and generate one or more analog output signal streams for that user 110.

Similarly, HMDs 112 may each operate substantially similar to HMD 112 of FIG. 1A by tracking hand 132 and/or arm 134 of user 110C, and rendering the portions of hand 132 that are within field of view 130 as virtual hand 136 within artificial reality content 122. HMD 112B may receive input data from wearable device 111B and/or from controllers 114A and 114B held by user 110B. HMD 112A may also operate substantially similar to HMD 112 of FIG. 1A and receive user inputs by tracking movements of hands 132A, 132B of user 110A. Wearable devices 111 and controllers 114 may be in communication with HMDs 112 using near-field communication of short-range wireless communication such as Bluetooth, using wired communication links, or using another type of communication links.

In a manner similar to the examples discussed above with respect to FIG. 1A, console 106, wearable device 111C, and/or HMD 112C of artificial reality system 200 generate and render user interface elements 124, 126, which may be overlaid upon the artificial reality content 122 displayed to user 110C. Moreover, console 106 and/or HMD 112C may trigger the generation and dynamic display of the user interface elements 124, 126 based on detection, via pose tracking, of intuitive, yet distinctive, gestures performed by user 110C. For example, artificial reality system 200 may dynamically present one or more graphical user interface elements 124, 126 in response to detecting one or more particular gestures by user 110C, such as particular motions, configurations, positions, and/or orientations of the user's hands, fingers, thumbs or arms. As shown in FIG. 1B, in addition to image data captured via camera 138 of HMD 112C, input data from wearable device 111C along with image data captured by external cameras 102 may be used to track and detect particular motions, configurations, positions, and/or orientations of hands and arms of users 110, such as hand 132 of user 110C, including movements of individual and/or combinations of digits (fingers, thumb) of the hand.

As described herein, and with reference to FIG. 1B, any of HMDs 112A, 112B, and 112C may detect a gesture and/or an interaction with a UI element presented at a display within those HMDs, and in response present a graphical UI element enabling that user to specify input to be processed by artificial reality system 200. For example, HMD 112C or wearable device 111C may detect motion of hand 132, and may further determine that the motion includes a recognizable gesture. HMD 112C may, in response, present updated artificial reality content to user 110 that includes a UI element enabling user 110C to, for example, provide input to artificial reality system 200 in a manner similar to that described in FIG. 1A.

Figure 2A:
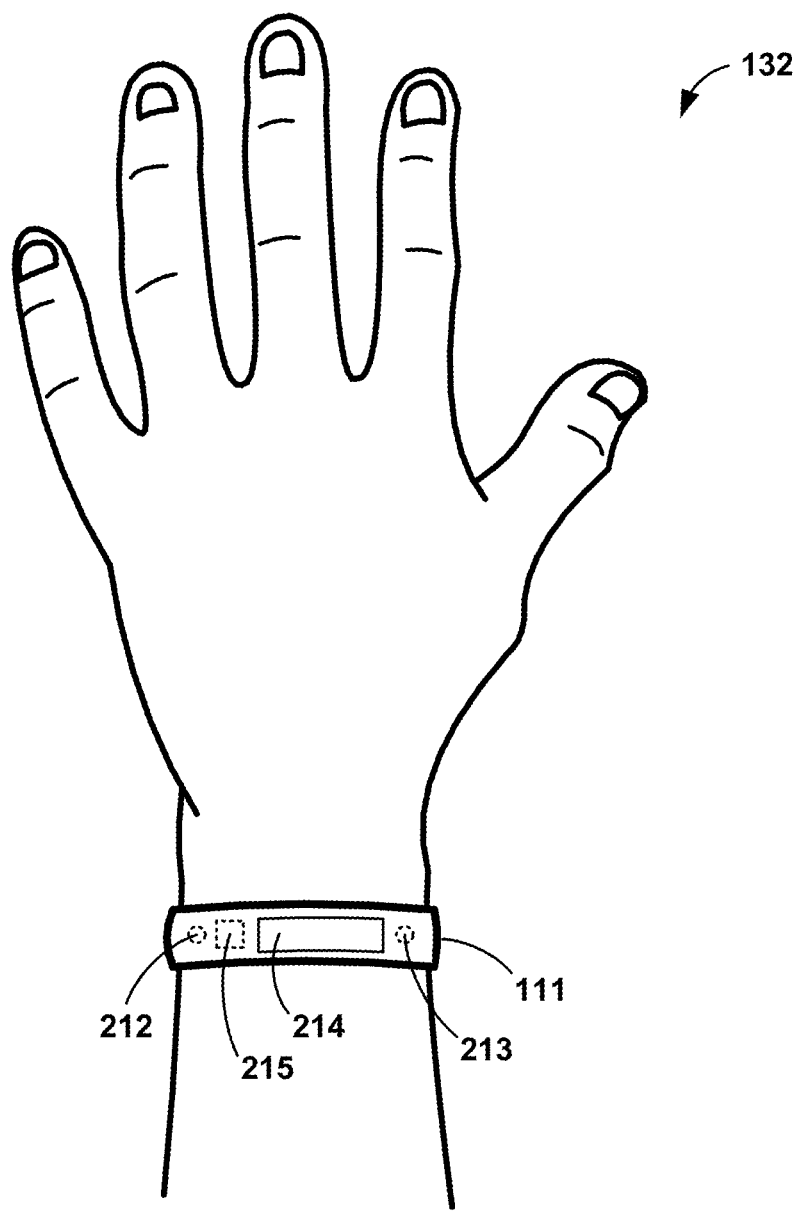
FIG. 2A is an illustration depicting an example wearable device configured to operate in accordance with the techniques of this disclosure.

FIG. 2A is an illustration depicting an example wearable device 111 configured to operate in accordance with the techniques of this disclosure. In the example of FIG. 2A, wearable device 111 may be worn on the wrist of a user's hand 132. Although illustrated in FIG. 2A as a relatively small device relative to hand 132, wearable device 111 may, in other examples, be a different size, and may be significantly larger, enabling use of a larger display or enabling other types or more numerous sensors or input devices. Similarly, other forms of wearable device 111 are possible, and the illustration of FIG. 2A is merely one example. For instance, wearable device 111 may take the form of a ring, arm band, adhesive patch, or any other wearable form.

Although wearable device 111 may operate on its own, as a standalone device, wearable device 111 may also be part of an XR system, such as XR systems 100, 200 of FIG. 1A and/or FIG. 1B. Accordingly, wearable device 111 may be an example of wearable device 111 of FIG. 1A and FIG. 1B.

Wearable device 111 may include one or more IMU sensors 212, one or more EMG sensors 213, one or more output devices 214, and one or more gesture detection modules 215. Wearable device 111 uses IMU sensors 212 and/or EMG sensors 213 to sense movement of hand 132, or movements of ligaments or other internal tissue within the user's wrist, and generate a stream of output data. Processing circuitry 215 uses such data to determine the likelihood of a gesture having been performed (or in the process of being performed). Based on the determined likelihood, processing circuitry may awaken or start other processes or devices within wearable device 111 (or housed within other components of XR systems 100 or 200). In some examples, based on a determination that a gesture has not been performed or is not being performed, wearable device 111 may cause other processes or devices to cease some or all of the processing that might have previously been initiated.

In the example of FIG. 2A, IMU sensor 212 may be an inertial measurement unit (IMU) that measures and reports a sensed force, angular rate, and/or orientation using a combination of accelerometers, gyroscopes, and/or magnetometers. In some examples, IMU sensor 212 may be capable of operating in a low power mode, and can awaken itself or be awakened in response to physical movement. IMU sensor 212 may include some processing capability, including the ability to process decision trees and/or perform some amount of compute processing or application of machine learning models. Accordingly, IMU sensor 212 may include one or more processors, controllers, and/or some processing logic or processing circuitry. In other examples, IMU sensor 212 may be a relatively dumb device that merely wakes up in response to movement and produces a stream of data describing the movement. For ease of illustration, one IMU sensor 212 is shown included within wearable device 111 of FIG. 2A. In some examples, one IMU sensor 212 might be sufficient, but in other examples, wearable device 111 may include more than one IMU sensor 212.

One or more EMG sensors 213 may be skin sensors that are capable of sensing tissue movement, such as by transducing sensed skeletal muscle activity and/or electromyography (EMG) data to analog output signal streams ("channels"). In some examples, EMG sensors 213 are tissue movement sensors positioned on the surface of wearable device 111, often on an underside or skin-facing surface of wearable device 111. Typically, wearable device 111 will include multiple EMG sensors 213 so that muscle activity at various points on the wrist can be measured. In some forms, each of EMG sensors 213 may consume a significant amount of power, making use of multiple EMG sensors 213 in a low-power, persistent-on wearable device 111 a power consumption challenge. Accordingly, while using a large number of EMG sensors 213 (e.g., sixteen EMG sensors 213) may enable make gesture detection and differentiation accurate and reliable, the power consumed by so many EMG sensors 213 will often make such an implementation impractical. Therefore, in some examples, a smaller number of EMG sensors 213 may be included within wearable device 111 (e.g., on the order of three or six EMG sensors 213), with few, if any, operating in a persistent-on mode.

As further described herein, the full set of EMG sensors 213 may be incrementally enabled and activated (e.g., one or two at a time) at strategic times to support detection and identification of gestures performed by hand 132. In one example, one EMG sensor 213 may be activated initially to enable gesture detection module 215 to determine, based on data received from that EMG sensor 213 and IMU sensor 212, if a gesture has been performed. If so, gesture detection module 215 may then enable additional EMG sensors 213 to support accurate identification of the gesture.

In implementations where wearable device 111 includes multiple EMG sensors 213, which of those multiple EMG sensors 213 to initially activate may be an important consideration, since that the initially active EMG sensor(s) would play an important role in detecting a gesture. In some examples, gesture detection module 215 may determine how EMG sensors 213 should be activated initially and incrementally. For example, gesture detection module 215 may determine which of EMG sensors 213 should be the first to be activated, and in what order to activate successive multiple EMG sensors 213. Gesture detection module 215 may make such determinations based on data received from IMU sensor 212, which may provide information about the user's hand or wrist position, pose, or orientation. Gesture detection module 215 may also make such determinations based on information available from other sensors or based on context (e.g., the application being used or the activity that the user is otherwise performing).

In some examples, gesture detection module 215 may alternatively, or in addition, evaluate a particular user's wrist movements over time and develop a "fingerprint" of the user's hand or wrist movements. Such a fingerprint may be used to determine which EMG sensors 213 at which locations on the user's wrist are most effective in sensing whether a gesture has occurred and/or identifying the gesture. In other words, electromyography information may vary sufficiently across multiple users such that the wrist locations of particular EMG sensors 213 that are critical for detecting and/or identifying a gesture for one set of users may differ significantly from those that are critical for another set of users.

Output device 214 may have the form of a display or information panel, as illustrated in FIG. 2A. Alternatively, or in addition, other types of output devices 214 may be implemented in wearable device 111. In some examples, output devices 214 may include light-generating devices, audio or sound generating devices, haptic response-producing devices, display devices, and/or any other type of output device.

Gesture detection module 215 may include one or more processors, systems on a chip (SOCs), or other logic used to perform functions described herein. Gesture detection module 215 may include logic for identifying, based on data streamed from IMU sensor 212 and/or one or more EMG sensors 213, whether a gesture has been performed. Gesture detection module 215 may also include logic for identifying the specific gesture performed. In some examples, gesture detection module 215 may include a neural network or logic for applying trained machine learning models to identify gestures based on sensed data, and then act on (or cause other devices to act on) the identified gesture.

Figure 2B:
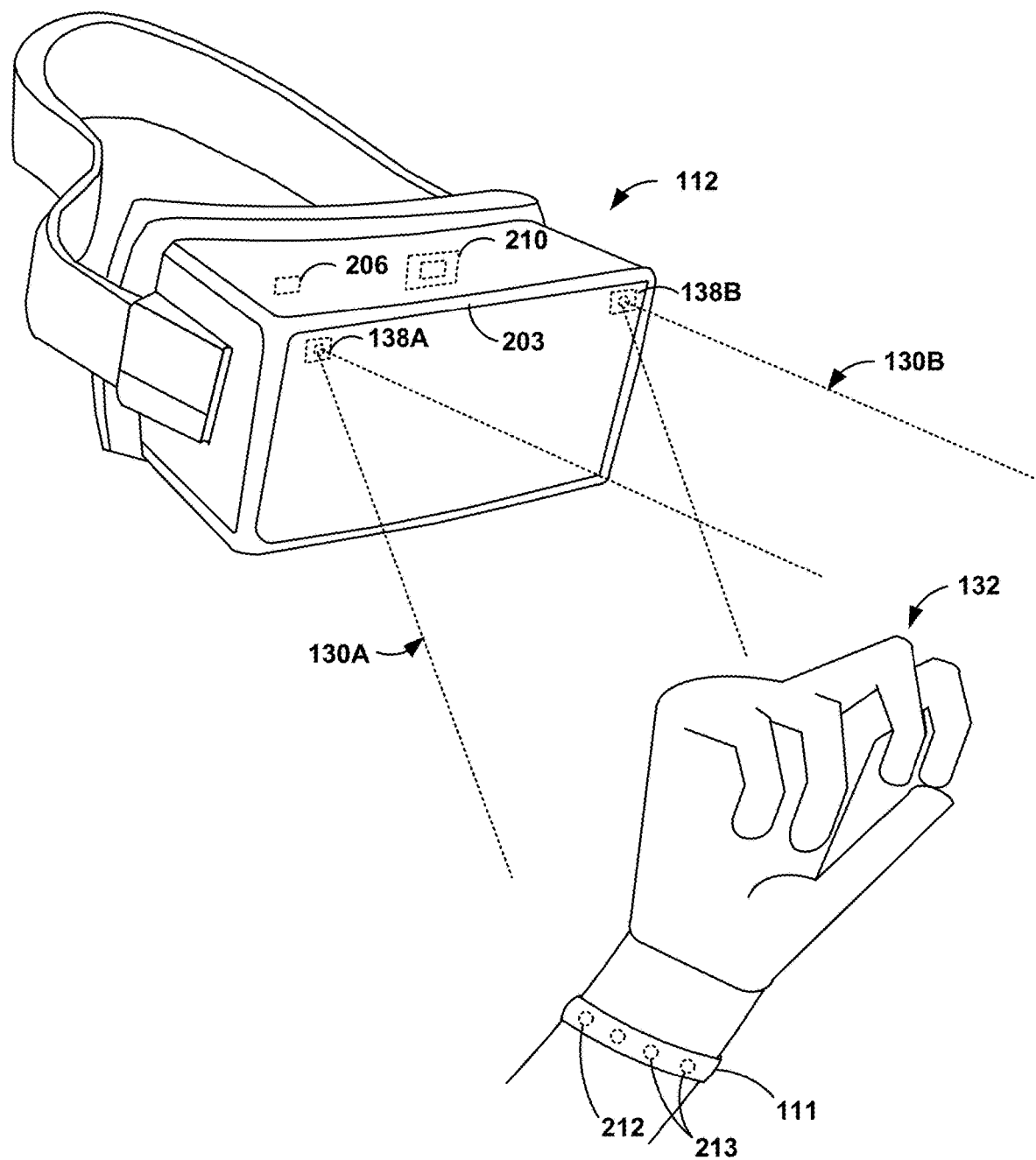
FIG. 2B is an illustration depicting an example HMD along with an example wearable device configured to operate in accordance with the techniques of the disclosure.

FIG. 2B is an illustration depicting an example HMD 112 along with an example wearable device 111 configured to operate in accordance with the techniques of the disclosure. Wearable device 111 of FIG. 2B may be an example of any of wearable devices 111 of FIGS. 1A, 1B, and 2A. Similarly, HMD 112 of FIG. 2B may be an example of any of HMDs 112 of FIGS. 1A and 1B. Wearable device 111 and HMD 112 of FIG. 2B may each be part of an XR system, such as XR systems 100, 200 of FIGS. 1A, 1B, or may operate as a stand-alone, mobile XR system configured to implement the techniques described herein.

In the example of FIG. 2B, wearable device 111 includes a number of sensors 212 located on the skin-facing undersurface of a bracelet-like structure. HMD 112 includes a front rigid body and a band to secure HMD 112 to a user. In addition, HMD 112 includes an interior-facing electronic display 203 configured to present XR content to the user. Electronic display 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 203 relative to the front rigid body of HMD 112 is used as a frame of reference, also referred to as a local origin, when tracking the position and orientation of HMD 112 for rendering XR content according to a current viewing perspective of HMD 112 and the user. In other examples, HMD may take the form of other wearable head mounted displays, such as glasses.

As further shown in FIG. 2B, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, laser scanners, Doppler radar scanners, depth scanners, or the like, configured to output image data representative of the physical environment. More specifically, image capture devices 138 capture image data representative of objects in the physical environment that are within a field of view 130A, 130B of image capture devices 138, which typically corresponds with the viewing perspective of HMD 112. HMD 112 includes an internal control unit 210, which may include an internal power source and one or more printed-circuit boards having one or more processors, memory, and hardware to provide an operating environment for executing programmable operations to process sensed data and present artificial reality content on display 203.

In one example, in accordance with the techniques described herein, control unit 210 is configured to, based on the data sensed by components of HMD 112 and/or wearable device 111, identify a specific gesture or combination of gestures performed by the user and, in response, perform an action. For example, in response to one identified gesture, control unit 210 may generate and render a specific user interface element overlaid on artificial reality content for display on electronic display 203. As explained herein, in accordance with the techniques of the disclosure, control unit 210 may perform object recognition within image data captured by image capture devices 138 to identify a hand 132, fingers, thumb, arm or another part of the user, and track movements of the identified part to identify pre-defined gestures performed by the user. In response to identifying a pre-defined gesture, control unit 210 takes some action, such as selecting an option from an option set associated with a user interface element, translating the gesture into input (e.g., characters), launching an application or otherwise displaying content, and the like. In some examples, control unit 210 dynamically generates and presents a user interface element, such as a menu, in response to detecting a pre-defined gesture specified as a "trigger" for revealing a user interface. In other examples, control unit 210 performs such functions in response to direction from an external device, such as console 106, which may perform, object recognition, motion tracking and gesture detection, or any part thereof.

As described herein, HMD 112 may detect a motion of hand 132 corresponding to a specific gesture. Such motion may be based on image data captured by image capture devices 138 and/or based on movement data sensed by wearable device 111. HMD 112 may, in some examples, interpret such motion as a request by a user of HMD 112 to perform a task, present a graphical UI element, or otherwise affect the environment within which wearable device 111 and HMD 111 operate.

Figure 3A:
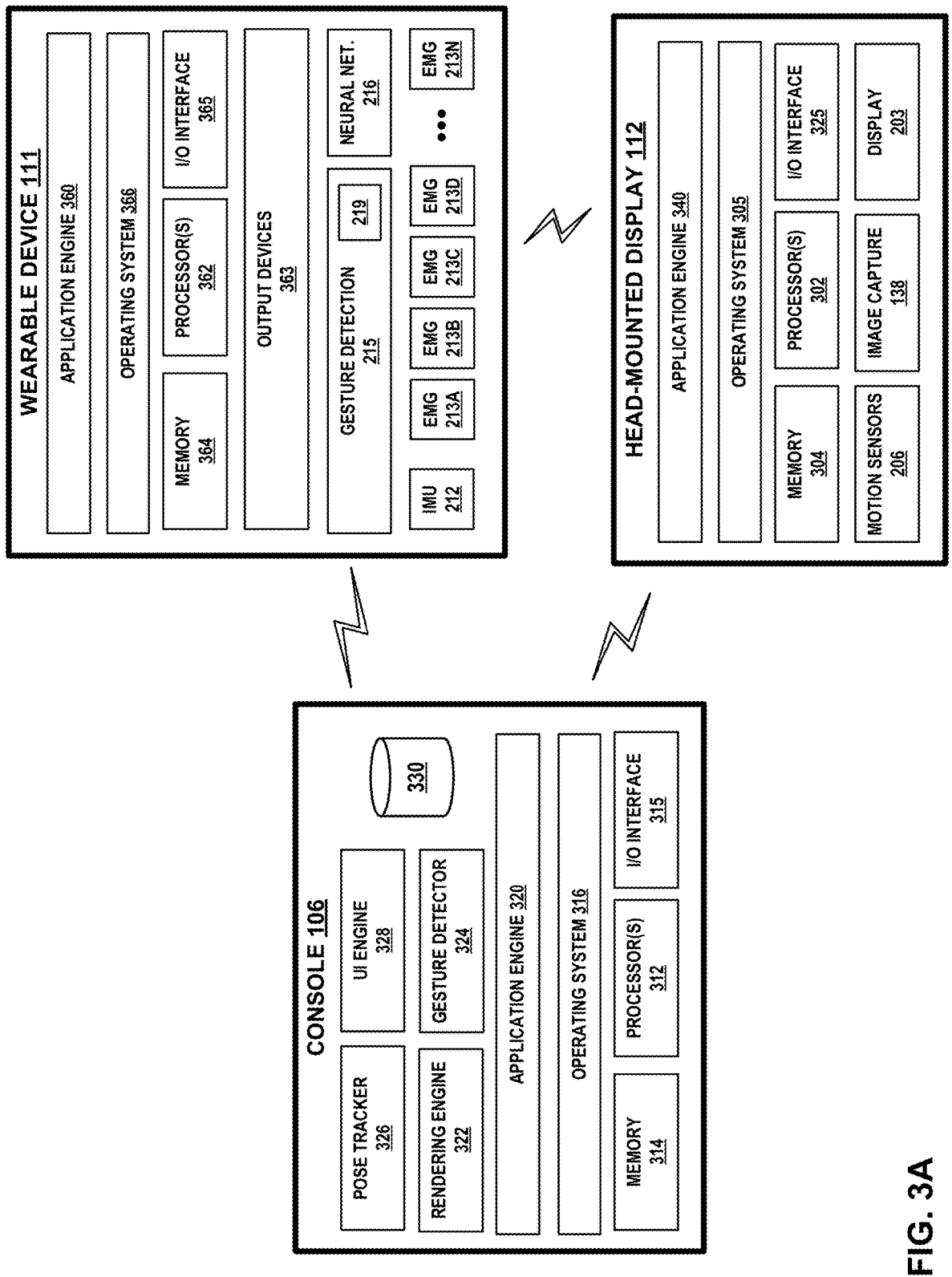
FIG. 3A is a block diagram showing example implementations of a wearable device, a console, and an HMD of an artificial reality system, in accordance with one or more aspects of the present disclosure.

FIG. 3A is a block diagram showing example implementations of console 106, wearable device 111, and head mounted display 112 of XR system 100, 20 of FIGS. 1A, 1B. In the example of FIG. 3A, console 106 may perform pose tracking, gesture detection, and user interface generation and rendering for wearable device 111 and HMD 112 in accordance with the techniques described herein. Such operations may be performed based on sensed data, including motion data and image data received from wearable device 111, HMD 112, and/or external sensors (e.g., cameras 102).

In the example of FIG. 3A, wearable device 111 includes one or more processors 362, one or more memory devices 364, and one or more I/O interfaces 365. Processors 362 and memory devices 364 provide, in some examples, a computing platform for executing operating system 366. Operating system 366 may be an embedded, near-real-time multitasking operating system or any other type of operating system. Operating system 366 may provide a multitasking operating environment for executing one or more software components, including application engine 360 and/or gesture detection module 215 and neural network 216. Processors 362 may be coupled to one or more I/O interfaces 365, which provide one or more I/O interfaces for communicating with external devices, such as HMD 112 and/or console 106.

In some examples, output devices 363 may correspond to output device 214 described and illustrated in connection with FIG. 2A. In other examples, one or more output devices 363 may represent any output device that may generate, receive, and/or process output from any type of device capable of outputting information to a human or machine. For example, one or more output devices 117 may generate, receive, and/or process output in the form of electrical and/or physical output (e.g., peripheral device, actuator). Output devices 363 may include an audio device, presence-sensitive screen, one or more USB interfaces, video and/or audio output interfaces, a display, or any other type of device capable of generating tactile, audio, visual, video, or other output (e.g., a haptic response, a sound, a flash of light, and/or images). Some output devices 363 may serve as both input and output devices. For example, a communication device may both send and receive data to and from other systems or devices over a network. Also, a touch-sensitive or presence-sensitive display may both detect input in the form of physical taps or gestures, and present output in the form of visual information.

Gesture detection module 215 may be a module within a system on a chip (SOCs), or other logic used to perform functions described herein. Gesture detection module 215 may correspond to gesture detection module 215 as described in connection with FIG. 2A. Neural network 216 may be a model trained to identify a gesture based on data from IMU sensors 212 and one or more of EMG sensors 213. In some examples, neural network 216 may be trained to identify a gesture (or identify that no gesture occurred) from a varying number of EMG sensors 213, each of which may be progressively and/or incrementally activated.

Wearable device 111 also includes IMU sensor 212 and EMG sensors 213A to 213N (collectively "EMG sensors 213," and representing any number of EMG sensors). These components may also correspond to like-numbered components of wearable device 111 illustrated and described in connection with FIG. 2A, and may be implemented in a manner consistent with the description of the corresponding system provided in connection with FIG. 2A, although in some examples such systems may involve alternative implementations with more, fewer, and/or different capabilities. In general, systems, devices, components, and illustrated in FIG. 3A may correspond to like-numbered systems, devices, components, and entities illustrated in FIG. 1A, FIG. 1B, FIG. 2A, and FIG. 2B, and may be described in a manner consistent with the description provided in connection with FIG. 1A, FIG. 1B, FIG. 2A, and FIG. 2B.

HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 307, including application engine 340. As discussed with respect to the example of FIG. 2B, processors 302 are coupled to electronic display 203, motion sensors 206 and image capture devices 138. In some examples, processors 302 and memory 304 may be separate, discrete components. In other examples, memory 304 may be on-chip memory collocated with processors 302 within a single integrated circuit.

In general, console 106 is a computing device that processes image and tracking information received from cameras 102 (FIG. 1B) and/or HMD 112 to perform gesture detection and user interface generation for HMD 112. In some examples, console 106 is a single computing device, such as a workstation, a desktop computer, a laptop, or gaming system. In some examples, at least a portion of console 106, such as processors 312 and/or memory 314, may be distributed across a cloud computing system, a data center, or across a network, such as the Internet, another public or private communications network, for instance, broadband, cellular, Wi-Fi, and/or other types of communication networks for transmitting data between computing systems, servers, and computing devices.

In the example of FIG. 3A, console 106 includes one or more processors 312 and memory 314 that, in some examples, provide a computer platform for executing an operating system 316, which may be an embedded, real-time multitasking operating system, for instance, or other type of operating system. In turn, operating system 316 provides a multitasking operating environment for executing one or more software components. Processors 312 are coupled to one or more I/O interfaces 315, which provides one or more I/O interfaces for communicating with external devices, such as a keyboard, game controllers, display devices, image capture devices, HMDs, and the like. Moreover, the one or more I/O interfaces 315 may include one or more wired or wireless network interface controllers (NICs) for communicating with a network, such as network 104. Each of processors 302, 312 may comprise any one or more of a multi-core processor, a controller, a digital signal processor (DSP), an application specific integrated circuit (ASIC), a field-programmable gate array (FPGA), or equivalent discrete or integrated logic circuitry. Memory 304, 314 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), and flash memory.

Software applications of console 106 operate to provide an overall artificial reality application. In this example, software applications include application engine 320, rendering engine 322, gesture detector 324, pose tracker 326, and user interface engine 328.

In general, application engine 320 includes functionality to provide and present an XR application, e.g., a teleconference application, a gaming application, a navigation application, an educational application, training or simulation applications, and the like. Application engine 320 may include, for example, one or more software packages, software libraries, hardware drivers, and/or Application Program Interfaces (APIs) for implementing an artificial reality application on console 106. Responsive to control by application engine 320, rendering engine 322 generates 3D XR content for output and/or presentation (e.g., display, sounds, haptic feedback through HMD 112 or otherwise) to the user by application engine 340 of HMD 112.

Application engine 320 and rendering engine 322 construct the content for display and/or presentation to user 110 in accordance with current pose information for a frame of reference, typically a viewing perspective of HMD 112, as determined by pose tracker 326. Based on the current viewing perspective, rendering engine 322 constructs the 3D, XR content which may in some cases be overlaid, at least in part, upon the real-world 3D environment of user 110. During this process, pose tracker 326 operates on sensed data received from HMD 112, such as movement information and user commands, and, in some examples, data from any external sensors 190 (FIGS. 1A, 1B), such as external cameras, to capture 3D information within the real world environment, such as motion by user 110 and/or feature tracking information with respect to user 110. Based on the sensed data, pose tracker 326 determines a current pose for the frame of reference of HMD 112 and, in accordance with the current pose, constructs the XR content for communication, via the one or more I/O interfaces 315, to HMD 112 for display to user 110.

Moreover, based on the sensed data, gesture detector 324 analyzes the tracked motions, configurations, positions, and/or orientations of objects (e.g., hands, arms, wrists, fingers, palms, thumbs) of the user to identify one or more gestures performed by user 110. More specifically, gesture detector 324 analyzes objects recognized within image data captured by image capture devices 138 of HMD 112 and/or sensors 190 and external cameras 102 to identify a hand and/or arm of user 110, and track movements of the hand and/or arm relative to HMD 112 to identify gestures performed by user 110. Gesture detector 324 may track movement, including changes to position and orientation, of the hand, digits, and/or arm based on the captured image data, and compare motion vectors of the objects to one or more entries in gesture library 330 to detect a gesture or combination of gestures performed by user 110. Some entries in gesture library 330 may each define a gesture as a series or pattern of motion, such as a relative path or spatial translations and rotations of a user's hand, specific fingers, thumbs, wrists and/or arms. Some entries in gesture library 330 may each define a gesture as a configuration, position, and/or orientation of the user's hand and/or arms (or portions thereof) at a particular time, or over a period of time. Other examples of type of gestures are possible. In addition, each of the entries in gesture library 330 may specify, for the defined gesture or series of gestures, conditions that are required for the gesture or series of gestures to trigger an action, such as spatial relationships to a current field of view of HMD 112, spatial relationships to the particular region currently being observed by the user, as may be determined by real-time gaze tracking of the individual, types of XR content being displayed, types of applications being executed, and the like.

Each of the entries in gesture library 330 further may specify, for each of the defined gestures or combinations/series of gestures, a desired response or action to be performed by software applications 317. For example, in accordance with the techniques of this disclosure, certain specialized gestures may be pre-defined such that, in response to detecting one of the pre-defined gestures, user interface engine 328 dynamically generates a user interface as an overlay to XR content being displayed to the user, thereby allowing the user 110 to easily invoke a user interface for configuring HMD 112 and/or console 106 even while interacting with XR content. In other examples, certain gestures may be associated with other actions, such as providing input, selecting objects, launching applications, and the like.

In FIG. 3A, and in accordance with one or more aspects of the present disclosure, wearable device 111 may detect motion by user 110. For instance, in an example that can be described in the context of FIG. 2A and FIG. 3A, IMU sensor 212 of wearable device 111 detects input and outputs information about the input to gesture detection module 215. Gesture detection module 215 determines that the input signifies movement of wearable device 111 (e.g., caused by movement by hand 132). IMU sensor 212 continues to collect a stream of input from IMU sensor 212 describing motion.

Wearable device 111 may awaken one or more of EMG sensors 213. For instance, continuing with the example being described in the context of FIG. 2A and FIG. 3A, gesture detection module 215 responds to the detected movement of wearable device 111 by causing EMG sensor 213A to collect electromyography data. Gesture detection module 215 receives a stream of data from EMG sensor 213A. Gesture detection module 215 performs preprocessing and/or digital signal processing operations on the data received from EMG sensor 213A. In the example being described, gesture detection module 215 only awakens EMG sensor 213A at this point. In other examples, however, gesture detection module 215 may cause EMG sensor 213B (and possibly other EMG sensors 213) to also start collecting electromyography data in response to detecting movement by wearable device 111. In such examples, gesture detection module 215 may also perform preprocessing and/or other digital signal processing operations on the data received from each additional EMG sensor 213.

Wearable device 111 may perform processing to determine whether a gesture has been performed. For instance, in the example being described, gesture detection module 215 of wearable device 111 evaluates the preprocessed data derived from the data streamed by IMU sensor 212 and EMG sensor 213A. In some examples, such an evaluation may involve application of model 219 to identify whether a gesture has occurred based on data generated by IMU sensor 212 and one EMG sensor 213. In such an example, model 219 is a machine learning model trained to make a binary determination based on such inputs: whether a gesture has occurred or not. At least in that sense, model 219 may be relatively simple, and might be implemented through machine learning models that are less compute and power intensive, such as a regression model or an ensemble of decision trees. In some examples, model 219 might alternatively be trained to classify the motion into three categories (still using relatively lightweight processing techniques), where such categories classify the motion as: (1)

definitely involving a gesture, (2) definitely not involving a gesture, and (3) indeterminate. In the example being described, model 219 of gesture detection module 215 may be a model trained simply to determine whether a gesture has been performed or not, and model 219 might not be trained to identify any specific gesture.

Wearable device 111 may perform processing to identify the gesture performed. For instance, still referring to the example being described in the context of FIG. 2A and FIG. 3A, wearable device 111 may also cause neural network 216 to evaluate the preprocessed data derived from the data streamed by IMU sensor 212 and EMG sensor 213A to identify the gesture that has been performed. In some examples, gesture detection module 215 initiates processing by neural network 216 after model 219 is initiated, and before model 219 completes its processing. Further, in some examples, gesture detection module 215 may cause neural network 216 to operate on data from IMU sensor 212 and EMG sensor 213A that has been preprocessed to a greater extent than the data being evaluated by model 219.

Wearable device 111 may choose to terminate processing by neural network 216 in appropriate scenarios. For instance, continuing with the example being described, neural network 216 starts processing after model 219, and performs a task (i.e., identifying which gesture has been performed) that may require more significant processing than the task performed by model 219 (i.e., merely identifying whether a gesture was performed). Further, model 219 may involve application of a more complex model (e.g., a neural network) than the relatively less complex processes employed by model 219 (e.g., regression models or ensembles of decision trees). For at least those reasons, model 219 is likely to complete its determination of whether a gesture has been performed before neural network 216 identifies the gesture. Accordingly, if model 219 determines definitively that no gesture occurred, gesture detection module 215 may cause neural network 216 to cease processing, since presumably neural network 216 will reach the same conclusion (i.e., that no gesture occurred). In such a situation, expenditure of computing cycles and power that might otherwise be consumed during further processing by neural network 216 can be avoided. If, however, model 219 determines that a gesture did occur (or that a gesture might have occurred), gesture detection module 215 enables neural network 216 to continue processing.

Wearable device 111 may, based on the results of processing by neural network 216, enable or awaken other components of wearable device 111. For instance, in an example where neural network 216 continues to process (e.g., because model 219 determined that a gesture might have occurred), gesture detection module 215 may determine that neural network 216 may more accurately identify the gesture that has been performed if data from additional EMG sensors 213 is collected. In such an example, gesture detection module 215 enables one or more of EMG sensors 213 (e.g., EMG sensors 213B and 213C). Gesture detection module 215 collects data from each of EMG sensors 213A, 213B, and 213C. Gesture detection module 215 preprocesses the data and outputs the data to neural network 216 to assist neural network 216 in identifying the gesture. In some examples, neural network 216 may output information to gesture detection module 215 about its progress in identifying the gesture performed. Gesture detection module 215 may, based on such information, determine that enabling additional EMG sensors 213 may be helpful to identify the gesture. In response to such a determination, gesture detection module 215 may enable further EMG sensors 213, preprocess data from such EMG sensors 213, and output the additional data to neural network 216.

Figure 5:
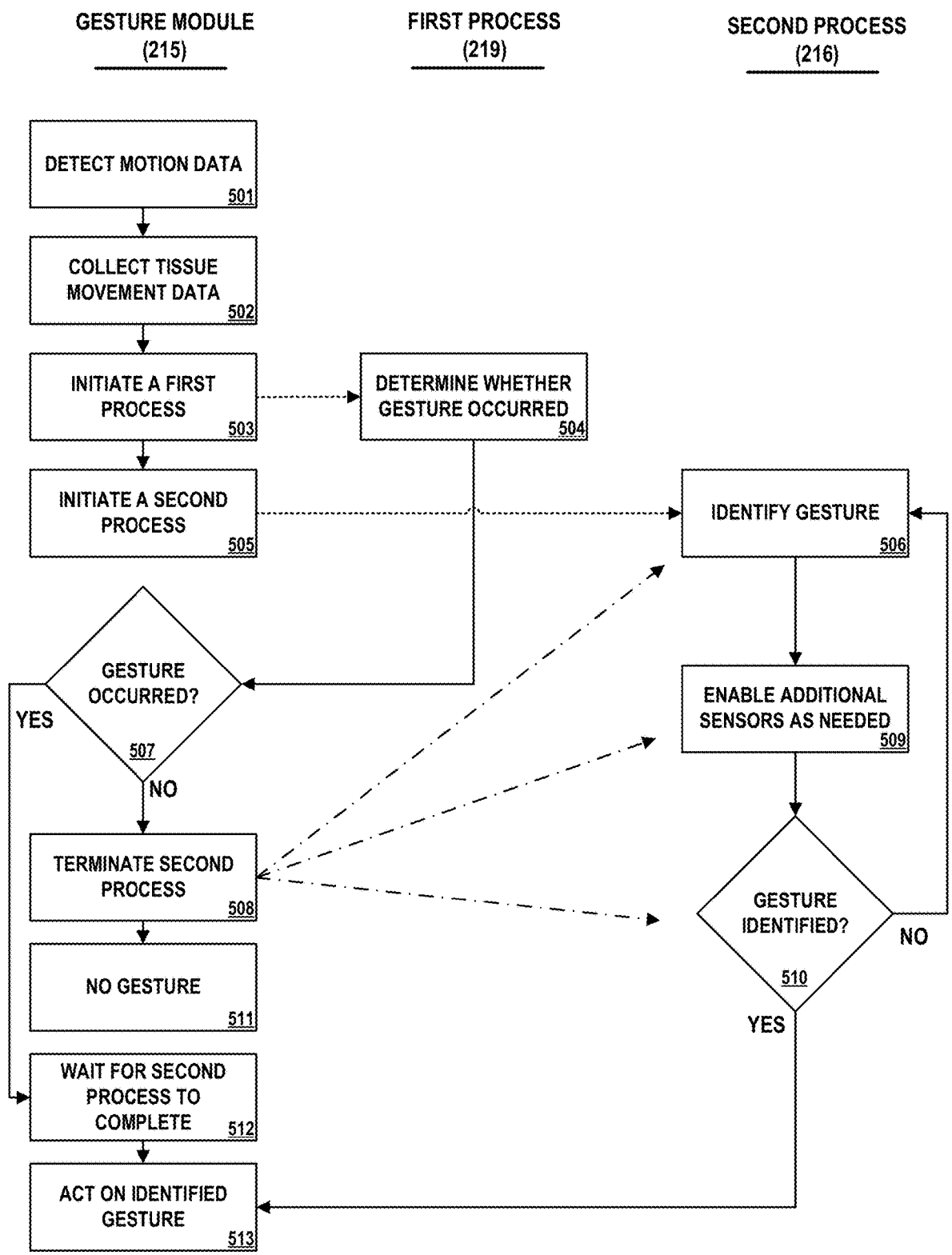
FIG. 5 is a flow diagram illustrating an example process for detecting a gesture performed by an example wearable device in accordance with one or more aspects of the present disclosure.

Wearable device 111 may start other components of wearable device 111 in anticipation of later needs. For instance, still referring to FIG. 2A and FIG. 3A, neural network 216 may determine actionable information about the gesture even before the gesture has been identified. For example, neural network 216 may, prior to identifying the specific gesture, nevertheless determine that some gesture has been performed that will require use of an application engine. In some examples, wearable device 111 may wake up or engage application engine 360 of wearable device 111, but in other examples, the wearable device may wake up or engage an application within another device within the artificial reality system (e.g., application engine 320 of console 106, application engine 340 of HMD 112, or an application engine executing on peripheral device 436 as illustrated in FIG. 5). Neural network 216 may output information about the gesture to gesture detection module 215. In response to such information, gesture detection module 215 may awaken the appropriate application engine (e.g., application engine 360) in anticipation of a gesture being identified that will require a subsequent operation being performed by the application engine. By awakening the application engine, gesture detection module 215 may be able to avoid any startup time, wakeup time, or other associated latency that could delay a response to the gesture once the gesture is definitively identified.

Eventually, wearable device 111 may identify the gesture and act on it. For instance, again referring to FIG. 3A, neural network 216 eventually identifies the specific gesture (or gestures) performed by user 110. Neural network 216 outputs information about the identified gesture to gesture detection module 215. Gesture detection module 215 outputs an indication of the identified gesture to application engine 360. Application engine 360 performs an appropriate action in response to the identified gesture. For example, application engine 360 may cause one or more output devices 363 to perform operations (e.g., make a sound, generate a haptic response, emit light, display data on a display screen). In other examples, application engine 360 may cause I/O interface 365 to output a signal to HMD 112, which may respond by updating content presented within display 203. Similarly, application engine 360 may alternatively, or in addition, cause I/O interface 365 to output a signal to console 106. Console 106 may respond to such a signal by performing an operation that causes an effect within an AR or VR environment appropriate to the identified gesture.

In some cases, a typical user 110 might expect that wearable device 111 should respond to a gesture within a relatively short amount of time, on the order of 700 milliseconds or so. If model 219 can identify whether a gesture has occurred, and neural network 216 can identify the gesture, and further, if application engine 360 can perform an appropriate response to the gesture within an appropriate timeframe (e.g., less than 800 milliseconds), then user 110 may view wearable device 111 as sufficiently responsive. However, if that combination of operations takes longer than approximately 700-800 milliseconds, user 110 may perceive wearable device 111 as not sufficiently responsive. In examples where that full combination of operations takes too long, the user's perception of the responsiveness of wearable device 111 may be improved if some user feedback is provided by wearable device 111 along the way, before the gesture is acted upon by application engine 360 or even before neural network 216 definitively identifies the gesture.

Such feedback may involve one or more of output devices 363 performing a relatively simple operation (e.g., making a sound, generating a haptic response, emitting light, presenting data on a display screen) that tends to provide some indication to user 110 that the gesture he or she has performed is being acted upon.

Figure 3B:
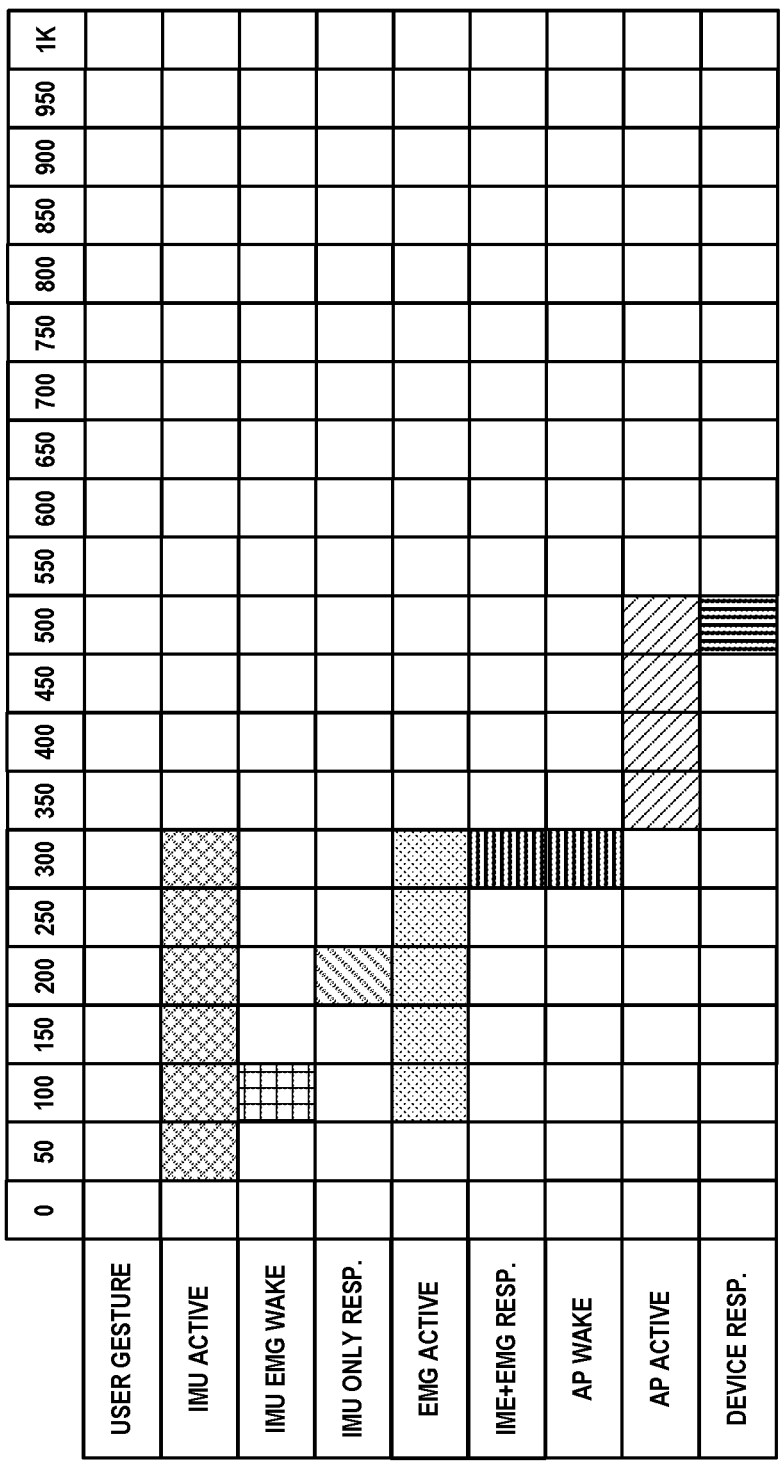
FIG. 3B is a conceptual diagram illustrating the timing of active states of components of an example wearable device.

FIG. 3B is a conceptual diagram illustrating a chart of the timing of active states of components of an example wearable device, such as wearable device 111 described in connection with FIG. 2A and FIG. 3A. FIG. 3B illustrates example timeframes (i.e., from 0 to 1000 milliseconds, as indicated along the top of the chart) for such components. In the depicted example, the user's gesture commences at 0 milliseconds and continues for 850 milliseconds. An IMU sensor (e.g., IMU sensor 212) is active by 50 milliseconds after the start of the gesture, and at least one EMG sensor (e.g., EMG sensor 213) is active by 100 milliseconds after the start of the gesture. Eventually, at 350 milliseconds, an application processor is started, and the wearable device 111 responds by 500 milliseconds.

Figure 4:
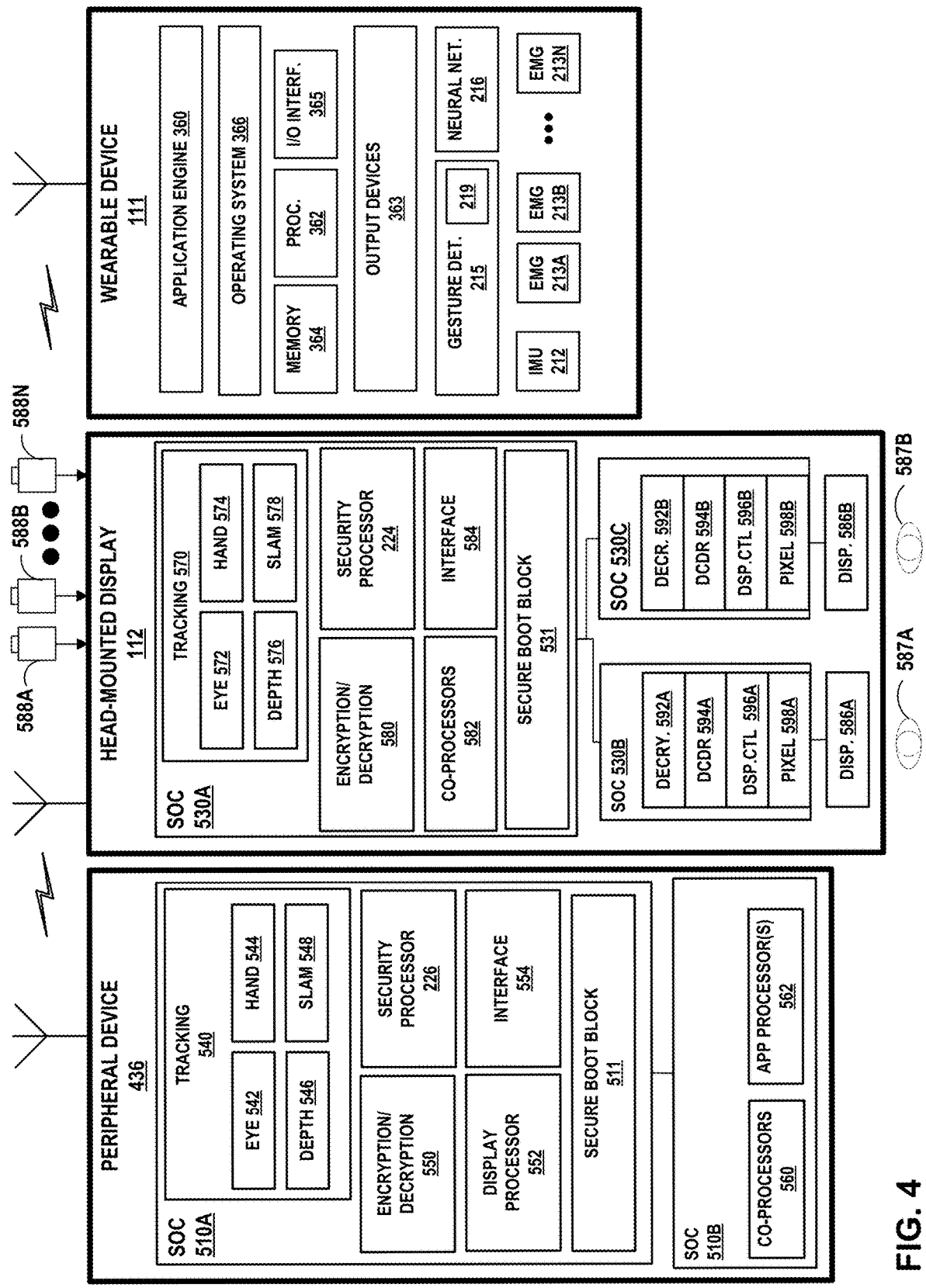
FIG. 4 is a block diagram illustrating an example implementation of a distributed architecture for a multi-device artificial reality system in which one or more devices are implemented using one or more SoC integrated circuits within each device, in accordance with one or more aspects of the present disclosure.

FIG. 4 is a block diagram illustrating an example implementation of a distributed architecture for a multi-device artificial reality system in which one or more devices are implemented using one or more SoC integrated circuits within each device, in accordance with one or more aspects of the present disclosure. In the example of FIG. 4, one or more devices (e.g., HMD 112, peripheral device 436, and wearable device 111) are implemented using one or more System-on-a-Chip (SoC) integrated circuits, in accordance with the techniques described in this disclosure. HMD 112, peripheral device 436, and wearable device 111 exchange data through wired and/or wireless communications via a communication link 502. HMD 112 may be an example of any of HMDs 112 of FIG. 1A, 1B, or 2B, and wearable device 111 may be an example of any of wearable devices 111 of FIG. 1A, 1B, 2A, or 2B. Each of wearable device 111 and HMD 112 may be part of an artificial reality system, such as artificial reality systems 100, 200 of FIGS. 1A, 1B, or may operate as a stand-alone, mobile artificial reality system configured to implement the techniques described herein.

In the example of FIG. 4, HMD 112 includes SoCs 530A-530M (collectively, "HMD SoCs 530") and peripheral device 436 includes SoCs 510A and 510B (collectively, "peripheral device SoCs 510"). Although not specifically illustrated in FIG. 4, wearable device 111 may include one or more SoCs. In general, SoCs as implemented in devices illustrated in FIG. 4 represent a collection of specialized integrated circuits arranged in a distributed architecture and configured to provide an operating environment for artificial reality applications. As examples, SoC integrated circuits may include specialized functional blocks operating as co-application processors, sensor aggregators, encryption/decryption engines, security processors, hand/eye/depth tracking and pose computation elements, video encoding and rendering engines, display controllers and communication control components.

In general, the SoCs illustrated in FIG. 4 represent a collection of specialized integrated circuits arranged in a distributed architecture, where each SoC integrated circuit includes various specialized functional blocks configured to provide an operating environment for artificial reality applications. FIG. 4 shows merely one example arrangement of SoC integrated circuits on various devices. The distributed architecture for a multi-device artificial reality system may include any collection and/or arrangement of SoC integrated circuits.

For example, secure boot block 511 of SOC 510A and secure boot block 531 of SOC 530A may perform a multi-stage boot process to reduce the likelihood of an attack SOCs 510A and 530A.

Accordingly, security processor 224 of HMD 112 provides secure device attestation and mutual authentication for HMD when pairing with other devices, e.g., peripheral device 436, that are used in conjunction within the AR environment.

In this example, SoC 530A of HMD 112 comprises functional blocks including security processor 224, tracking 570, an encryption/decryption 580, co-processors 582, and an interface 584. Tracking 570 provides a functional block for eye tracking 572 ("eye 572"), hand tracking 574 ("hand 574"), depth tracking 576 ("depth 576"), and/or Simultaneous Localization and Mapping (SLAM) 578 ("SLAM 578"). For example, HMD 112 may receive input from one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. HMD 112 may also receive image data from one or more image capture devices 588A-588N (collectively, "image capture devices 588"). Image capture devices may include video cameras, laser scanners, Doppler radar scanners, depth scanners, or the like, configured to output image data representative of the physical environment. More specifically, image capture devices capture image data representative of objects (including peripheral device 436 and/or hand) in the physical environment that are within a field of view of image capture devices, which typically corresponds with the viewing perspective of HMD 112. Based on the sensed data and/or image data, tracking 570 determines, for example, a current pose for the frame of reference of HMD 112 and, in accordance with the current pose, renders the artificial reality content.

Encryption/decryption 580 is a functional block to encrypt outgoing data communicated to peripheral device 436 or security server and decrypt incoming data communicated from peripheral device 436 or security server. Encryption/decryption 580 may support symmetric key cryptography to encrypt/decrypt data with a session key (e.g., secret symmetric key). For example, when sending the device certificates to the security server via peripheral device 436 for attestation, encryption/decryption 580 encrypts device certificates of SoCs 530A-530C with a first session key ($S_{k1}$) for securely communicating the device certificates to peripheral device 436. Encryption/decryption 580 also encrypts the device certificates with a public key to securely communicate the device certificates to the security server. In response to receiving a pairing certificate encrypted with the second session key ($S_{k2}$) from peripheral device 436, encryption/decryption 580 decrypts the encrypted pairing certificate using the second session key ($S_{k2}$). In some examples, the security server may digitally sign the pairing certificate by encrypting a hash of the pairing certificate with a private key. In these examples, encryption/decryption 580 verifies the signature using a server public key and verifies the authenticity and integrity of the pairing certificate (e.g., by running the pairing certificate through the same hashing algorithm as the security server).

Co-application processors 582 includes one or more processors for executing instructions, such as a video processing unit, graphics processing unit, digital signal processors, encoders and/or decoders, and/or others.

Interface 584 is a functional block that includes one or more interfaces for connecting to functional blocks of SoC 530A. As one example, interface 584 may include peripheral component interconnect express (PCIe) slots. SoC 530A may connect with SoC 530B, 530C using interface 584. SoC 530A may connect with a communication device (e.g., radio transmitter) using interface 584 for communicating with other devices, e.g., peripheral device 436.

SoCs 530B and 530C each represents display controllers for outputting artificial reality content on respective displays, e.g., displays 586A, 586B (collectively, "displays 586"). In this example, SoC 530B may include a display controller for display 568A to output artificial reality content for a left eye 587A of a user. For example, SoC 530B includes a decryption block 592A, decoder block 594A, display controller 596A, and/or a pixel driver 598A for outputting artificial reality content on display 586A. Similarly, SoC 530C may include a display controller for display 568B to output artificial reality content for a right eye 587B of the user. For example, SoC 530C includes decryption 592B, decoder 594B, display controller 596B, and/or a pixel driver 598B for generating and outputting artificial reality content on display 586B. Displays 568 may include Light-Emitting Diode (LED) displays, Organic LEDs (OLEDs), Quantum dot LEDs (QLEDs), Electronic paper (E-ink) displays, Liquid Crystal Displays (LCDs), or other types of displays for displaying AR content.

As illustrated in FIG. 4, peripheral device 436 includes SoCs 510A and 510B configured to support an artificial reality application. In this example, SoC 510A comprises functional blocks including security processor 226, tracking 540, an encryption/decryption 550, a display processor 552, and an interface 554. Tracking 540 is a functional block providing eye tracking 542 ("eye 542"), hand tracking 544 ("hand 544"), depth tracking 546 ("depth 546"), and/or Simultaneous Localization and Mapping (SLAM) 548 ("SLAM 548"). For example, peripheral device 436 may receive input from one or more accelerometers and/or inertial measurement units that output data indicative of current acceleration of peripheral device 436, GPS sensors that output data indicative of a location of peripheral device 436, radar or sonar that output data indicative of distances of peripheral device 436 from various objects, or other sensors that provide indications of a location or orientation of peripheral device 436 or other objects within a physical environment. Peripheral device 436 may in some examples also receive image data from one or more image capture devices, such as video cameras, laser scanners, Doppler radar scanners, depth scanners, or the like, configured to output image data representative of the physical environment. Based on the sensed data and/or image data, tracking block 540 determines, for example, a current pose for the frame of reference of peripheral device 436 and, in accordance with the current pose, renders the artificial reality content to HMD 112.

Encryption/decryption 550 encrypts outgoing data communicated to HMD 112 or security server and decrypts incoming data communicated from HMD 112 or security server. Encryption/decryption 550 may support symmetric key cryptography to encrypt/decrypt data using a session key (e.g., secret symmetric key).

Display processor 552 includes one or more processors such as a video processing unit, graphics processing unit, encoders and/or decoders, and/or others, for rendering artificial reality content to HMD 112.

Interface 554 includes one or more interfaces for connecting to functional blocks of SoC 510A. As one example, interface 584 may include peripheral component interconnect express (PCIe) slots. SoC 510A may connect with SoC 510B using interface 584. SoC 510A may connect with one or more communication devices (e.g., radio transmitter) using interface 584 for communicating with other devices, e.g., HMD 112.

As discussed with respect to the example of FIG. 2A, security processor 226 provides secure device attestation and mutual authentication of peripheral device 436 when pairing with devices, e.g., HMD 112, used in conjunction within the AR environment. When peripheral device 436 is powered on and performs a secure boot, security processor 226 may authenticate SoCs 510A, 510B of peripheral device 436 based on the pairing certificate stored in NVM 514. If a pairing certificate does not exist or the devices to be paired have changed, security processor 226 may send to the security server device certificates of SoCs 510A, 510B for attestation.

SoC 510B includes co-application processors 560 and application processors 562. In this example, co-application processors 560 includes various processors, such as a vision processing unit (VPU), a graphics processing unit (GPU), and/or central processing unit (CPU). Application processors 562 may execute one or more artificial reality applications to, for instance, generate and render artificial reality content and/or to detect and interpret gestures performed by a user with respect to peripheral device 436.

Although not specifically shown in wearable device 111 in FIG. 4, some or all of the features, systems, and/or capabilities described herein with respect to peripheral device 436 and/or HMD 112 may be implemented by or appropriately incorporated within wearable device 111. Similarly, functions of wearable device 111 described herein (e.g., in connection with FIG. 3) may apply to the system of devices illustrated in FIG. 4.

FIG. 5 is a flow diagram illustrating an example process for detecting a gesture performed by an example wearable device 111 in accordance with one or more aspects of the present disclosure. The process of FIG. 5 is illustrated from three different perspectives: operations performed by an example gesture detection module 215 (left-hand column), operations performed by a first process initiated by gesture detection module 215 (e.g. model 219 of module 215, corresponding to the middle column), and operations performed by a second process initiated by gesture detection module 215 (e.g., neural network 216, corresponding to the right-hand column).

In the example of FIG. 5, the left-hand illustrated process may be performed by gesture detection module 215 of wearable device 111 in the context illustrated in FIG. 3A. The first process, illustrated in the middle column, may be a process initiated and/or orchestrated by gesture detection module 215 of wearable device 111 of FIG. 3A, and may correspond to operations performed by model 219 of FIG. 3A. The second process, illustrated in the right-hand column, may also be a process initiated and/or orchestrated by gesture detection module 215 of wearable device 111, and may correspond to operations performed by neural network 216 of FIG. 3A. In other examples, different operations may be performed, or operations described in FIG. 5 as being performed by a particular component, module, system, and/or device may be performed by one or more other components, modules, systems, and/or devices. Further, in other examples, operations described in connection with FIG. 5 may be performed in a different sequence, merged, omitted, or may encompass additional operations not specifically illustrated or described even where such operations are shown performed by more than one component, module, system, and/or device.

In the process illustrated in FIG. 5, and in accordance with one or more aspects of the present disclosure, wearable device 111 may detect motion data (501). For example, with reference to FIG. 3A, IMU sensor 212 may detect input and output information about the input to gesture detection module 215. Gesture detection module 215 may determine that the input corresponds to motion data, such as might be produced when a user of wearable device 111 moves a wrist or hand when wearable device 111 is attached to the wrist. In some examples, gesture detection module 215 responds to the input by enabling, activating, and/or awakening one or more of EMG sensors 213.

Wearable device 111 may collect tissue movement data (502). For example, again referring to FIG. 3A, EMG sensor 213A (which may have just been awakened by gesture detection module 215), detects electromyography data and outputs information about the electromyography data to gesture detection module 215. In some examples, one or more additional EMG sensors 213 may also detect electromyography data. In such examples, those additional EMG sensors 213 output information about the collected electromyography data to gesture detection module 215.

Wearable device 111 may initiate a first process to determine whether a gesture occurred (503). For example, still referring to FIG. 3A, gesture detection module 215 starts a first process that determines, based on the motion data and the tissue movement data, whether a gesture occurred. This first process may be performed by model 219 of gesture detection module 215. Gesture detection module 215 performs preprocessing and/or digital signal processing tasks on the motion data and/or the tissue movement data. Gesture detection module 215 outputs the preprocessed data to model 219. In some examples, model 219 is a trained machine learning model to determine simply whether a gesture might have occurred or whether a gesture definitely did not occur (or alternatively, model 219 may classify the collected data in one of three categories: (1) a gesture did occur, (2) a gesture did not occur, or (3) a gesture might have occurred). Model 219 may be trained using both IMU sensor data and EMG sensor data. In some examples, model 219 may be trained to classify the data based on only one IMU sensor 212 and one EMG sensor 213. Model 219 begins starts processing the preprocessed data from gesture detection module 215 to determine whether a gesture occurred (504).

Wearable device 111 may initiate a second process to identify which gesture was performed (505). For example, gesture detection module 215 starts a second process that seeks to identify, based on the motion data and the tissue movement data, the gesture that corresponds to such data. This second process may be performed by neural network 216 of wearable device 111. In some examples, neural network 216 is a more robust classification model than neural network 216, requiring more processing power and more time to complete its processing. Neural network 216 receives the data generated as a result of gesture detection module 215 performing preprocessing and/or digital signal processing tasks on the motion data and/or the tissue movement data. In some examples, neural network 216 might receive additional data and/or data that has undergone further processing. Neural network 216 begins processing such data to identify the gesture, if one occurred (506).

Wearable device 111 may determine whether a gesture occurred (507). For example, the first process, performed by model 219, reaches a conclusion about whether a gesture occurred. Model 219 outputs information about its conclusion to gesture detection module 215. Since the first process (model 219) started before the second process (neural network 216), and since the first process requires significantly less processing than the second process (both in terms of complexity of model and scope of classification to be assessed), the first process can be expected to complete before the second process. Accordingly, gesture detection module 215 uses the results of this first process to determine whether no gesture has been performed (NO path from 507). If no gesture was performed, gesture detection module 215 shuts down the second process (508), since the second process will presumably reach the same conclusion (511), thereby saving computing cycles and power consumption that would otherwise be expended with further processing by the second process.

If, however, the first process either determines that a gesture did occur (or that one might have occurred), gesture detection module 215 allows the second process to continue (YES path from 507). Wearable device 111 waits for the second process to complete (512). The second process may, in some examples, involve enabling additional EMG sensors 213 as needed to identify the gesture that was or is being performed (509). The second process continues until the gesture is identified (NO path from 510). Once the second process identifies the gesture (YES path from 510), the second process outputs information about the gesture to gesture detection module 215.

Wearable device 111 may act on the gesture (513). For example, gesture detection module 215 may, based on the information about the gesture received from the second process, identify an appropriate action to perform. Such an action may involve starting an application engine and/or interacting with console 106 or HMD 112. Where an application engine is started, such an application engine may be application engine 320 of console 106, application engine 340 of HMD 112, or an application engine executing on peripheral device 436 as illustrated in FIG. 4. In some examples, wearable device 111 may also include an application engine (i.e., application engine 360).

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

What is claimed is:

1. A wearable device capable of being worn by a user comprising:
    a motion detector configured to detect motion of the wearable device;
    a plurality of tissue movement sensors, each configured to collect tissue movement information associated with motion of tissues beneath the user's skin, wherein the plurality of tissue movement sensors includes a first tissue movement sensor and a second tissue movement sensor; and
    a gesture detection module comprising processing circuitry and configured to:
        detect, based on input sensed by the motion detector, motion data associated with movement of the wearable device,
        enable the first tissue movement sensor to collect tissue movement data associated with motion of tissues beneath the user's skin,
        initiate a first process to determine, based on the motion data and the tissue movement data, a likelihood that a gesture occurred,
        initiate a second process to identify, based on the motion data and the tissue movement data, the gesture, wherein the second process analyzes the tissue movement data and enables, based on the analysis, the second tissue movement sensor, and wherein at least a portion of the first process and a portion of the second process are performed concurrently,
        determine, by the first process and before the second process has completed, the likelihood that a gesture has occurred, and
        responsive to determining the likelihood, determining whether to allow the second process to continue.

2. The wearable device of claim 1, wherein to determine whether to allow the second process to continue, the gesture detection module is further configured to:
    determine that the likelihood indicates that no gesture has been performed; and
    stop the second process.

3. The wearable device of claim 1, wherein to determine whether to allow the second process to continue, the gesture detection module is further configured to:
    determine that the likelihood does not indicate that no gesture has been performed; and
    enable the second process to continue to identify the gesture.

4. The wearable device of claim 3, wherein the tissue movement data is a first set of tissue movement data, and wherein the gesture detection module is further configured to:
    enable the second tissue movement sensor to collect a second set of tissue movement data;
    enable the second process to identify the gesture further based on the second set of tissue movement data; and
    take an action in response to the gesture.

5. The wearable device of claim 1, wherein to enable the first tissue movement sensor, the gesture detection module is further configured to:
    choose to enable the first tissue movement sensor from among the plurality of tissue movement sensors based on the motion data.

6. The wearable device of claim 1,
    wherein to initiate the first process, the gesture detection module is further configured to initiate the first process to determine, based on a first set of preprocessed data, the likelihood that a gesture occurred; and
    wherein to initiate the second process, the gesture detection module is further configured to initiate the second process to identify, based on a second set of preprocessed data, the gesture,
    wherein the second set of preprocessed data is based on a later version of the motion data and the tissue movement data than the first set of preprocessed data.

7. The wearable device of claim 1,
    wherein to detect motion data, the gesture detection module is further configured to detect motion data by an inertial measurement unit (IMU); and
    wherein to enable the first tissue movement sensor, the gesture detection module is further configured to enable, by the IMU and in response to the IMU detecting motion data associated with the wearable device, the first tissue movement sensor.

8. The wearable device of claim 1, wherein the gesture detection module is further configured to:
    output, prior to identifying the gesture, user feedback indicating that the wearable device has sensed that an actionable gesture has been performed.

9. The wearable device of claim 1,
wherein to detect motion data, the gesture detection module is further configured to detect motion by an inertial measurement unit (IMU); and
wherein to collect tissue movement information, the gesture detection module is further configured to collect an electromyogram by an electromyograph.

10. The wearable device of claim 1,
wherein the first process is performed by an ensemble of decision trees; and
wherein the second process is performed by a neural network.

11. A method comprising:
detecting motion data associated with movement of a wearable device worn by a user;
enabling a first tissue movement sensor of a plurality of tissue movement sensors, each included within the wearable device, to collect tissue movement data associated with motion of tissues beneath the user's skin;
initiating a first process to determine, by a computing system and based on the motion data and the tissue movement data, a likelihood that a gesture occurred;
initiating a second process to identify, by the computing system and based on the motion data and the tissue movement data, the gesture, wherein the second process analyzes the tissue movement data and enables, based on the analysis, a second tissue movement sensor of the plurality of tissue movement sensors; and
wherein at least a portion of the first process and a portion of the second process are performed concurrently;
determining, by the first process and before the second process has completed, the likelihood that a gesture has occurred; and
responsive to determining the likelihood, determining, by the computing system, whether to allow the second process to continue.

12. The method of claim 11, wherein determining whether to allow the second process to continue includes:
determining that the likelihood indicates that no gesture has been performed; and
stopping the second process.

13. The method of claim 11, wherein determining whether to allow the second process to continue includes:
determining that the likelihood does not indicate that no gesture has been performed; and
enabling the second process to continue to identify the gesture.

14. The method of claim 13, wherein the tissue movement data is a first set of tissue movement data, and wherein the method further comprises:
enabling the second tissue movement sensor to collect a second set of tissue movement data;
enabling the second process to identify the gesture further based on the second set of tissue movement data; and
taking an action in response to the gesture.

15. The method of claim 11, wherein enabling the first tissue movement sensor includes:
choosing to enable the first tissue movement sensor from among the plurality of tissue movement sensors based on the motion data.

16. The method of claim 11,
wherein initiating the first process includes initiating the first process to determine, based on a first set of preprocessed data, the likelihood that a gesture occurred; and
wherein initiating the second process includes initiating the second process to identify, based on a second set of preprocessed data, the gesture,
wherein the second set of preprocessed data is based on a later version of the motion data and the tissue movement data than the first set of preprocessed data.

17. The method of claim 11,
wherein detecting motion data includes detecting motion data by an inertial measurement unit (IMU); and
wherein enabling the first tissue movement sensor includes enabling, by the IMU and in response to the IMU detecting motion data associated with the wearable device, the first tissue movement sensor.

18. The method of claim 11, further comprising:
outputting, by the wearable device and prior to identifying the gesture, user feedback indicating that the wearable device has sensed that an actionable gesture has been performed.

19. The method of claim 11,
wherein detecting motion data includes detecting motion by an inertial measurement unit (IMU); and
wherein collecting tissue movement information includes collecting an electromyogram by an electromyograph.

20. A system comprising:
a head-mounted display (HMD), capable of being worn by a user;
a peripheral device; and
a wearable device that is capable of being worn by the user and that includes a first sensor, a second sensor, and a third sensor, and wherein the wearable device is configured to:
detect, based on input sensed by the first sensor, a first set of motion data associated with movement of the wearable device,
enable the second sensor to collect a second set of motion data associated with motion of the user,
initiate a first process to determine, based on the first set of motion data and the second set of motion data, a likelihood that a gesture occurred,
initiate a second process to identify, based on the first set of motion and the second set of motion data, the gesture, wherein the second process analyzes the second set of motion data and enables, based on the analysis, the third sensor; and wherein at least a portion of the first process and a portion of the second process are performed concurrently,
determine, by the first process and before the second process has completed, the likelihood that a gesture has occurred, and
responsive to determining the likelihood, determining whether to allow the second process to continue.

21. The system of claim 20,
wherein the first sensor includes at least one of an IMU sensor, an EMG sensor, an audio sensor, an image sensor, a heartrate sensor, a carbon electrode, an electrocardiogram sensor; and
wherein the second sensor includes at least one of an IMU sensor, an EMG sensor, an audio sensor, an image sensor, a heartrate sensor, a carbon electrode, an electrocardiogram sensor.

* * * * *